(12) United States Patent
Pawar et al.

(10) Patent No.: US 11,544,221 B2
(45) Date of Patent: *Jan. 3, 2023

(54) SYSTEMS AND METHODS TO IDENTIFY UNPROTECTED VIRTUAL MACHINES

(71) Applicant: Commvault Systems, Inc., Tinton Falls, NJ (US)

(72) Inventors: Rahul S. Pawar, Marlboro, NJ (US); Rajiv Kottomtharayil, Marlboro, NJ (US); Parag Gokhale, Marlboro, NJ (US); Sumer Dilip Deshpande, Ocean, NJ (US); Henry Wallace Dornemann, Eatontown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/918,512

(22) Filed: Jul. 1, 2020

(65) Prior Publication Data

US 2020/0334201 A1 Oct. 22, 2020

Related U.S. Application Data

(63) Continuation of application No. 15/670,381, filed on Aug. 7, 2017, now Pat. No. 10,733,143, which is a
(Continued)

(51) Int. Cl.
*G06F 16/13* (2019.01)
*G06F 16/27* (2019.01)
*G06F 11/14* (2006.01)

(52) U.S. Cl.
CPC .......... *G06F 16/13* (2019.01); *G06F 11/1451* (2013.01); *G06F 11/1458* (2013.01);
(Continued)

(58) Field of Classification Search
CPC ............. G06F 11/1464; G06F 11/1451; G06F 11/1458; G06F 11/1484; G06F 11/1461; G06F 2201/815; G06F 16/13; G06F 16/27
(Continued)

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

EP 0259912 A1 3/1988
EP 0405926 A2 1/1991
(Continued)

OTHER PUBLICATIONS

Bastiaansen, "Robs Guide to Using Vmware: Covers Workstation, ACE, GSX and ESX Server", Second Edition, Books4Brains, 2005, 178 pages.
(Continued)

*Primary Examiner* — Robert W Beausoliel, Jr.
*Assistant Examiner* — Arthur Ganger
(74) *Attorney, Agent, or Firm* — Commvault Systems, Inc.

(57) ABSTRACT

Virtualization sprawl can lead to virtual machines with no designated periodic backup. If the data associated with these unprotected virtual machines is not backed up, it cannot be restored if needed, leading to system failures. A data storage system identifies and protects the unprotected virtual machines. For instance, the system compares a list of virtual machines with a list of computing devices having a designated backup policy in the data storage system and determines which of the virtual machines are unprotected. The system further automatically categorizes the unprotected
(Continued)

virtual machines, identifies those unprotected virtual machines that remain uncategorized, and applies a default backup policy to the uncategorized and unprotected virtual machines to provide protected virtual machines.

20 Claims, 11 Drawing Sheets

Related U.S. Application Data continuation of application No. 13/930,795, filed on Jun. 28, 2013, now Pat. No. 9,740,702.

(60) Provisional application No. 61/740,929, filed on Dec. 21, 2012.

(52) U.S. Cl.
CPC .......... *G06F 11/1484* (2013.01); *G06F 16/27* (2019.01); *G06F 11/1461* (2013.01); *G06F 11/1464* (2013.01); *G06F 2201/815* (2013.01)

(58) Field of Classification Search
USPC ...................................................... 707/654
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi |
| 5,454,099 A | 9/1995 | Myers et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,594,901 A | 1/1997 | Andoh |
| 5,619,644 A | 4/1997 | Crockett et al. |
| 5,638,509 A | 6/1997 | Dunphy et al. |
| 5,642,496 A | 6/1997 | Kanfi |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,101,585 A | 8/2000 | Brown et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,397,242 B1 | 5/2002 | Devine et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. |
| 6,542,972 B2 | 4/2003 | Ignatius et al. |
| 6,564,228 B1 | 5/2003 | O'Connor |
| 6,581,076 B1 | 6/2003 | Ching et al. |
| 6,658,436 B2 | 12/2003 | Oshinsky et al. |
| 6,658,526 B2 | 12/2003 | Nguyen et al. |
| 6,721,767 B2 | 4/2004 | De Meno et al. |
| 6,760,723 B2 | 7/2004 | Oshinsky et al. |
| 6,772,290 B1 | 8/2004 | Bromley et al. |
| 6,820,214 B1 | 11/2004 | Cabrera et al. |
| 7,003,641 B2 | 2/2006 | Prahlad et al. |
| 7,035,880 B1 | 4/2006 | Crescenti et al. |
| 7,076,270 B2 | 7/2006 | Jaggers et al. |
| 7,107,298 B2 | 9/2006 | Prahlad et al. |
| 7,107,385 B2 | 9/2006 | Rajan et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,219,162 B2 | 5/2007 | Donker et al. |
| 7,246,207 B2 | 7/2007 | Kottomtharayil |
| 7,315,923 B2 | 1/2008 | Retnamma et al. |
| 7,324,543 B2 | 1/2008 | Wassew et al. |
| 7,343,356 B2 | 3/2008 | Prahlad et al. |
| 7,343,453 B2 | 3/2008 | Prahlad et al. |
| 7,346,751 B2 | 3/2008 | Prahlad et al. |
| 7,356,817 B1 | 4/2008 | Cota-Robles et al. |
| 7,376,895 B2 | 5/2008 | Tsao |
| 7,383,463 B2 | 6/2008 | Hayden et al. |
| 7,386,744 B2 | 6/2008 | Barr et al. |
| 7,389,311 B1 | 6/2008 | Crescenti et al. |
| 7,395,282 B1 | 7/2008 | Crescenti |
| 7,440,982 B2 | 10/2008 | Lu et al. |
| 7,448,079 B2 | 11/2008 | Tremain |
| 7,454,569 B2 | 11/2008 | Kavuri et al. |
| 7,475,282 B2 | 1/2009 | Tormasov et al. |
| 7,484,208 B1 | 1/2009 | Nelson |
| 7,490,207 B2 | 2/2009 | Amarendran et al. |
| 7,500,053 B1 | 3/2009 | Kavuri et al. |
| 7,502,820 B2 | 3/2009 | Manders et al. |

(56) References Cited

U.S. PATENT DOCUMENTS

| | | |
|---|---|---|
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,552,279 B1 | 6/2009 | Gandler |
| 7,561,899 B2 | 7/2009 | Lee |
| 7,568,080 B2 | 7/2009 | Prahlad |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,351 B2 | 12/2009 | Erofeev |
| 7,636,743 B2 | 12/2009 | Erofeev |
| 7,640,406 B1 | 12/2009 | Hagerstrom et al. |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,668,884 B2 | 2/2010 | Prahlad et al. |
| 7,685,177 B1 | 3/2010 | Hagerstrom et al. |
| 7,694,070 B2 | 4/2010 | Mogi et al. |
| 7,716,171 B2 | 5/2010 | Kryger |
| 7,721,138 B1 | 5/2010 | Lyadvinsky et al. |
| 7,725,893 B2 | 5/2010 | Jaeckel et al. |
| 7,730,035 B2 | 6/2010 | Berger et al. |
| 7,734,669 B2 | 6/2010 | Kottomtharayil et al. |
| 7,739,527 B2 | 6/2010 | Rothman et al. |
| 7,747,579 B2 | 6/2010 | Prahlad et al. |
| 7,756,835 B2 | 7/2010 | Pugh |
| 7,756,964 B2 | 7/2010 | Madison, Jr. et al. |
| 7,765,167 B2 | 7/2010 | Prahlad et al. |
| 7,778,984 B2 | 8/2010 | Zhang et al. |
| 7,788,665 B2 | 8/2010 | Oshins |
| 7,792,789 B2 | 9/2010 | Prahlad et al. |
| 7,793,307 B2 | 9/2010 | Gokhale et al. |
| 7,801,864 B2 | 9/2010 | Prahlad et al. |
| 7,802,056 B2 | 9/2010 | Demsey et al. |
| 7,809,914 B2 | 10/2010 | Kottomtharayil et al. |
| 7,822,967 B2 | 10/2010 | Fung |
| 7,823,145 B1 | 10/2010 | Le et al. |
| 7,840,537 B2 | 11/2010 | Gokhale |
| 7,861,234 B1 | 12/2010 | Lolo |
| 7,873,700 B2 | 1/2011 | Pawlowski et al. |
| 7,882,077 B2 | 2/2011 | Gokhale et al. |
| 7,890,467 B2 | 2/2011 | Watanable et al. |
| 7,899,788 B2 | 3/2011 | Chandhok et al. |
| 7,904,482 B2 | 3/2011 | Lent et al. |
| 7,917,617 B1 | 3/2011 | Ponnapur |
| 7,925,850 B1 | 4/2011 | Waldspurger et al. |
| 7,937,421 B2 | 5/2011 | Mikesell et al. |
| 7,937,612 B1 | 5/2011 | Lyadvinsky et al. |
| 7,970,965 B2 | 6/2011 | Kedem et al. |
| 8,001,277 B2 | 8/2011 | Mega et al. |
| 8,037,016 B2 | 10/2011 | Odulinski et al. |
| 8,037,028 B2 | 10/2011 | Prahlad et al. |
| 8,037,032 B2 | 10/2011 | Pershin et al. |
| 8,046,550 B2 | 10/2011 | Feathergill |
| 8,055,745 B2 | 11/2011 | Atluri |
| 8,060,476 B1 | 11/2011 | Afonso et al. |
| 8,069,271 B2 | 11/2011 | Brunet et al. |
| 8,099,391 B1 | 1/2012 | Monckton |
| 8,108,427 B2 | 1/2012 | Prahlad et al. |
| 8,112,605 B2 | 2/2012 | Kavuri |
| 8,117,492 B1 | 2/2012 | Searls et al. |
| 8,135,930 B1 | 3/2012 | Mattox et al. |
| 8,140,786 B2 | 3/2012 | Bunte |
| 8,156,301 B1 | 4/2012 | Khandelwal et al. |
| 8,170,995 B2 | 5/2012 | Prahlad et al. |
| 8,185,893 B2 | 5/2012 | Hyser et al. |
| 8,191,063 B2 | 5/2012 | Shingai et al. |
| 8,200,637 B1 | 6/2012 | Stringham |
| 8,209,680 B1 | 6/2012 | Le et al. |
| 8,219,524 B2 | 7/2012 | Gokhale |
| 8,219,653 B1 | 7/2012 | Keagy et al. |
| 8,219,769 B1 | 7/2012 | Wilk |
| 8,225,133 B1 | 7/2012 | Lyadvinsky et al. |
| 8,229,896 B1 | 7/2012 | Narayanan |
| 8,229,954 B2 | 7/2012 | Kottomtharayil et al. |
| 8,230,256 B1 | 7/2012 | Raut |
| 8,234,236 B2 | 7/2012 | Beaty et al. |
| 8,234,641 B2 | 7/2012 | Fitzgerald et al. |
| 8,266,099 B2 | 9/2012 | Vaghani |
| 8,266,406 B2 | 9/2012 | Kavuri |
| 8,285,681 B2 | 10/2012 | Prahlad et al. |
| 8,307,177 B2 | 11/2012 | Prahlad et al. |
| 8,307,187 B2 | 11/2012 | Chawla et al. |
| 8,315,992 B1 | 11/2012 | Gipp et al. |
| 8,346,726 B2 | 1/2013 | Liu et al. |
| 8,364,652 B2 | 1/2013 | Vijayan et al. |
| 8,370,542 B2 | 2/2013 | Lu et al. |
| 8,386,798 B2 | 2/2013 | Dodgson et al. |
| 8,396,838 B2 | 3/2013 | Brockway |
| 8,407,190 B2 | 3/2013 | Prahlad |
| 8,433,679 B2 | 4/2013 | Crescenti |
| 8,434,131 B2 | 4/2013 | Varadharajan |
| 8,438,347 B1 | 5/2013 | Tawri et al. |
| 8,453,145 B1 | 5/2013 | Naik |
| 8,458,419 B2 | 6/2013 | Basler et al. |
| 8,473,594 B2 | 6/2013 | Astete et al. |
| 8,473,652 B2 | 6/2013 | Amit et al. |
| 8,473,947 B2 | 6/2013 | Goggin et al. |
| 8,489,676 B1 | 7/2013 | Chaplin et al. |
| 8,495,108 B2 | 7/2013 | Nagpal et al. |
| 8,554,981 B2 | 10/2013 | Schmidt et al. |
| 8,560,788 B1 | 10/2013 | Sreedharan et al. |
| 8,577,845 B2 | 11/2013 | Nguyen et al. |
| 8,578,120 B2 | 11/2013 | Attarde et al. |
| 8,578,126 B1 | 11/2013 | Gaonkar et al. |
| 8,578,374 B2 | 11/2013 | Kane |
| 8,578,386 B1 | 11/2013 | Bali et al. |
| 8,612,439 B2 | 12/2013 | Prahlad et al. |
| 8,620,870 B2 | 12/2013 | Dwarampudi et al. |
| 8,635,429 B1 | 1/2014 | Naftel et al. |
| 8,667,171 B2 | 3/2014 | Guo et al. |
| 8,706,867 B2 | 4/2014 | Vijayan |
| 8,707,070 B2 | 4/2014 | Muller |
| 8,725,973 B2 | 5/2014 | Prahlad et al. |
| 8,751,857 B2 | 6/2014 | Frenkel et al. |
| 8,769,048 B2 | 7/2014 | Kottomtharayil |
| 8,776,043 B1 | 7/2014 | Thimsen et al. |
| 8,799,431 B2 | 8/2014 | Pabari |
| 8,805,788 B2 | 8/2014 | Gross, IV et al. |
| 8,831,202 B1 | 9/2014 | Abidogun et al. |
| 8,849,955 B2 | 9/2014 | Prahlad et al. |
| 8,850,146 B1 | 9/2014 | Majumdar |
| 8,904,008 B2 | 12/2014 | Calder et al. |
| 8,904,081 B1 | 12/2014 | Kulkarni |
| 8,909,774 B2 | 12/2014 | Vijayan |
| 8,924,967 B2 | 12/2014 | Nelson |
| 8,930,543 B2 | 1/2015 | Ashok et al. |
| 8,938,481 B2 | 1/2015 | Kumarasamy et al. |
| 8,938,643 B1 | 1/2015 | Karmarkar et al. |
| 8,954,446 B2 | 2/2015 | Vijayan Retnamma et al. |
| 8,954,796 B1 | 2/2015 | Cohen et al. |
| 8,959,509 B1 | 2/2015 | Sobel et al. |
| 8,966,318 B1 | 2/2015 | Shah |
| 9,015,181 B2 | 4/2015 | Kottomtharayil et al. |
| 9,020,895 B1 | 4/2015 | Rajashekar |
| 9,020,900 B2 | 4/2015 | Vijayan Retnamma et al. |
| 9,021,459 B2 | 4/2015 | Qu |
| 9,026,498 B2 | 5/2015 | Kumarasamy |
| 9,069,587 B2 | 6/2015 | Agarwal et al. |
| 9,098,457 B2 | 8/2015 | Towstopiat et al. |
| 9,098,495 B2 | 8/2015 | Gokhale |
| 9,098,514 B2 | 8/2015 | Dwarampudi et al. |
| 9,116,633 B2 | 8/2015 | Sancheti et al. |
| 9,124,633 B1 | 9/2015 | Eizadi et al. |
| 9,141,529 B2 | 9/2015 | Klein et al. |
| 9,146,755 B2 | 9/2015 | Lassonde et al. |
| 9,213,706 B2 | 12/2015 | Long et al. |
| 9,223,597 B2 | 12/2015 | Deshpande et al. |
| 9,235,474 B1 | 1/2016 | Petri et al. |

(56) References Cited

U.S. PATENT DOCUMENTS

| | | |
|---|---|---|
| 9,235,582 B1 | 1/2016 | Madiraju Varadaraju et al. |
| 9,239,687 B2 | 1/2016 | Vijayan et al. |
| 9,239,762 B1 | 1/2016 | Gunda et al. |
| 9,246,996 B1 | 1/2016 | Brooker |
| 9,268,602 B2 | 2/2016 | Prahlad et al. |
| 9,280,378 B2 | 3/2016 | Shah |
| 9,286,086 B2 | 3/2016 | Deshpande et al. |
| 9,286,110 B2 | 3/2016 | Mitkar et al. |
| 9,292,350 B1 | 3/2016 | Pendharkar et al. |
| 9,298,715 B2 | 3/2016 | Kumarasamy et al. |
| 9,311,121 B2 | 4/2016 | Deshpande et al. |
| 9,311,248 B2 | 4/2016 | Wagner |
| 9,342,537 B2 | 5/2016 | Kumarasamy |
| 9,378,035 B2 | 6/2016 | Kripalani |
| 9,397,944 B1 | 7/2016 | Hobbs et al. |
| 9,405,763 B2 | 8/2016 | Prahlad et al. |
| 9,417,968 B2 | 8/2016 | Dornemann et al. |
| 9,424,136 B1 | 8/2016 | Teater et al. |
| 9,436,555 B2 | 9/2016 | Dornemann et al. |
| 9,451,023 B2 | 9/2016 | Sancheti |
| 9,461,881 B2 | 10/2016 | Kumarasamy |
| 9,471,441 B1 | 10/2016 | Lyadvinsky et al. |
| 9,477,683 B2 | 10/2016 | Ghosh |
| 9,489,244 B2 | 11/2016 | Mitkar et al. |
| 9,495,370 B1 | 11/2016 | Chatterjee et al. |
| 9,495,404 B2 | 11/2016 | Kumarasamy et al. |
| 9,563,514 B2 | 2/2017 | Dornemann |
| 9,575,789 B1 | 2/2017 | Rangari et al. |
| 9,575,991 B2 | 2/2017 | Ghosh |
| 9,588,847 B1 | 3/2017 | Natanzon et al. |
| 9,588,972 B2 | 3/2017 | Dwarampudi et al. |
| 9,594,636 B2 | 3/2017 | Mortensen et al. |
| 9,606,745 B2 | 3/2017 | Satoyama et al. |
| 9,612,966 B2 | 4/2017 | Joshi et al. |
| 9,632,882 B2 | 4/2017 | Kumarasamy et al. |
| 9,633,033 B2 | 4/2017 | Vijayan et al. |
| 9,639,274 B2 | 5/2017 | Maranna et al. |
| 9,639,426 B2 | 5/2017 | Pawar et al. |
| 9,652,283 B2 | 5/2017 | Mitkar et al. |
| 9,684,535 B2 | 6/2017 | Deshpande et al. |
| 9,684,567 B2 | 6/2017 | Derk et al. |
| 9,703,584 B2 | 7/2017 | Kottomtharayil et al. |
| 9,710,465 B2 | 7/2017 | Dornemann et al. |
| 9,766,989 B2 | 7/2017 | Mitkar et al. |
| 9,740,702 B2 | 8/2017 | Pawar et al. |
| 9,740,723 B2 | 8/2017 | Prahlad et al. |
| 9,760,398 B1 | 9/2017 | Pai |
| 9,760,448 B1 | 9/2017 | Per et al. |
| 9,766,825 B2 | 9/2017 | Bhagi et al. |
| 9,823,977 B2 | 11/2017 | Dornemann et al. |
| 9,852,026 B2 | 12/2017 | Mitkar et al. |
| 9,904,598 B2 | 2/2018 | Kumarasamy |
| 9,928,001 B2 | 3/2018 | Dornemann et al. |
| 9,939,981 B2 | 4/2018 | White et al. |
| 9,965,316 B2 | 5/2018 | Deshpande et al. |
| 9,977,687 B2 | 5/2018 | Kottomtharayil et al. |
| 9,983,936 B2 | 5/2018 | Dornemann et al. |
| 9,996,287 B2 | 6/2018 | Dornemann et al. |
| 9,996,534 B2 | 6/2018 | Dornemann et al. |
| 10,048,889 B2 | 8/2018 | Dornemann et al. |
| 10,061,657 B1 | 8/2018 | Chopra |
| 10,061,658 B2 | 8/2018 | Long et al. |
| 10,108,652 B2 | 10/2018 | Kumarasamy et al. |
| 10,152,251 B2 | 12/2018 | Sancheti et al. |
| 10,162,528 B2 | 12/2018 | Sancheti et al. |
| 10,162,873 B2 | 12/2018 | Desphande et al. |
| 10,228,962 B2 | 3/2019 | Dornemann et al. |
| 10,379,892 B2 | 8/2019 | Kripalani |
| 10,387,073 B2 | 8/2019 | Bhagi et al. |
| 10,417,102 B2 | 9/2019 | Sanakkayala et al. |
| 10,437,505 B2 | 10/2019 | Dornemann et al. |
| 10,445,186 B1 | 10/2019 | vonThenen |
| 10,452,303 B2 | 10/2019 | Dornemann et al. |
| 10,474,483 B2 | 11/2019 | Kottomtharayil et al. |
| 10,474,542 B2 | 11/2019 | Mitkar et al. |
| 10,474,548 B2 | 11/2019 | Sanakkayala et al. |
| 10,481,984 B1 | 11/2019 | Semyonov et al. |
| 10,496,547 B1 | 12/2019 | Naenko |
| 10,565,067 B2 | 2/2020 | Dornemann |
| 10,572,468 B2 | 2/2020 | Dornemann et al. |
| 10,592,350 B2 | 3/2020 | Dornemann |
| 10,650,057 B2 | 5/2020 | Pawar et al. |
| 10,678,758 B2 | 6/2020 | Dornemann |
| 10,684,883 B2 | 6/2020 | Deshpande et al. |
| 10,733,143 B2 | 8/2020 | Pawar et al. |
| 10,747,630 B2 | 8/2020 | Sanakkayala et al. |
| 10,754,841 B2 | 8/2020 | Prahlad et al. |
| 10,768,971 B2 | 9/2020 | Dornemann et al. |
| 10,776,209 B2 | 9/2020 | Pawar et al. |
| 2002/0069369 A1 | 6/2002 | Tremain |
| 2002/0095609 A1 | 7/2002 | Tokunaga |
| 2002/0194511 A1 | 12/2002 | Swoboda |
| 2003/0031127 A1 | 2/2003 | Saleh et al. |
| 2003/0037211 A1 | 2/2003 | Winokur |
| 2003/0126494 A1 | 7/2003 | Strasser |
| 2003/0182427 A1 | 9/2003 | Halpern |
| 2003/0204597 A1 | 10/2003 | Arakawa et al. |
| 2004/0030668 A1 | 2/2004 | Pawlowski et al. |
| 2004/0030822 A1 | 2/2004 | Rajan et al. |
| 2004/0049553 A1 | 3/2004 | Iwamura et al. |
| 2004/0205152 A1 | 10/2004 | Yasuda et al. |
| 2004/0230899 A1 | 11/2004 | Pagnano et al. |
| 2005/0060356 A1 | 3/2005 | Saika |
| 2005/0060704 A1 | 3/2005 | Bulson |
| 2005/0080970 A1 | 4/2005 | Jeyasingh et al. |
| 2005/0108709 A1 | 5/2005 | Sciandra et al. |
| 2005/0198303 A1 | 9/2005 | Knauerhase et al. |
| 2005/0216788 A1 | 9/2005 | Mani-Meitav et al. |
| 2005/0262097 A1 | 11/2005 | Sim-Tang |
| 2006/0058994 A1 | 3/2006 | Ravi et al. |
| 2006/0064555 A1 | 3/2006 | Prahlad et al. |
| 2006/0101189 A1 | 5/2006 | Chandrasekaran et al. |
| 2006/0155712 A1 | 7/2006 | Prahlad et al. |
| 2006/0184935 A1 | 8/2006 | Abels et al. |
| 2006/0195715 A1 | 8/2006 | Herington |
| 2006/0224846 A1 | 10/2006 | Amarendran |
| 2006/0225065 A1 | 10/2006 | Chandhok et al. |
| 2006/0230136 A1 | 10/2006 | Ma |
| 2006/0259908 A1 | 11/2006 | Bayer |
| 2007/0027999 A1 | 2/2007 | Allen et al. |
| 2007/0043870 A1 | 2/2007 | Ninose |
| 2007/0089111 A1 | 4/2007 | Robinson et al. |
| 2007/0100792 A1 | 5/2007 | Lent et al. |
| 2007/0179995 A1 | 8/2007 | Prahlad et al. |
| 2007/0198802 A1 | 8/2007 | Kavuri |
| 2007/0203938 A1 | 8/2007 | Prahlad et al. |
| 2007/0208918 A1 | 9/2007 | Harbin et al. |
| 2007/0220319 A1 | 9/2007 | Desai et al. |
| 2007/0234302 A1 | 10/2007 | Suzuki et al. |
| 2007/0239804 A1 | 10/2007 | Armstrong et al. |
| 2007/0260831 A1 | 11/2007 | Michael et al. |
| 2007/0266056 A1 | 11/2007 | Stacey et al. |
| 2007/0288536 A1 | 12/2007 | Sen et al. |
| 2008/0005146 A1 | 1/2008 | Kubo et al. |
| 2008/0007765 A1 | 1/2008 | Ogata et al. |
| 2008/0028408 A1 | 1/2008 | Day et al. |
| 2008/0059704 A1 | 3/2008 | Kavuri |
| 2008/0071841 A1 | 3/2008 | Okada et al. |
| 2008/0091655 A1 | 4/2008 | Gokhale et al. |
| 2008/0126833 A1 | 5/2008 | Callaway et al. |
| 2008/0133486 A1 | 6/2008 | Fitzgerald et al. |
| 2008/0134175 A1 | 6/2008 | Fitzgerald et al. |
| 2008/0134177 A1 | 6/2008 | Fitzgerald et al. |
| 2008/0141264 A1 | 6/2008 | Johnson |
| 2008/0163206 A1 | 7/2008 | Nair |
| 2008/0189468 A1 | 8/2008 | Schmidt et al. |
| 2008/0195639 A1 | 8/2008 | Freeman et al. |
| 2008/0228771 A1 | 9/2008 | Prahlad et al. |
| 2008/0228833 A1 | 9/2008 | Kano |
| 2008/0229037 A1 | 9/2008 | Bunte |
| 2008/0235479 A1 | 9/2008 | Scales et al. |
| 2008/0243855 A1 | 10/2008 | Prahlad |
| 2008/0243947 A1 | 10/2008 | Kaneda |
| 2008/0244028 A1 | 10/2008 | Le et al. |

(56) References Cited

U.S. PATENT DOCUMENTS

| | | |
|---|---|---|
| 2008/0244068 A1 | 10/2008 | Iyoda et al. |
| 2008/0244177 A1 | 10/2008 | Crescenti et al. |
| 2008/0250407 A1 | 10/2008 | Dadhia et al. |
| 2008/0270564 A1 | 10/2008 | Rangegowda et al. |
| 2008/0275924 A1 | 11/2008 | Fries |
| 2008/0282253 A1 | 11/2008 | Huizenga |
| 2008/0313371 A1 | 12/2008 | Kedem et al. |
| 2008/0320319 A1 | 12/2008 | Muller |
| 2009/0006733 A1 | 1/2009 | Gold et al. |
| 2009/0037680 A1 | 2/2009 | Colbert et al. |
| 2009/0113109 A1 | 4/2009 | Nelson et al. |
| 2009/0144416 A1 | 6/2009 | Chatley et al. |
| 2009/0157882 A1 | 6/2009 | Kashyap |
| 2009/0210427 A1 | 8/2009 | Eidler et al. |
| 2009/0210458 A1 | 8/2009 | Glover et al. |
| 2009/0216816 A1 | 8/2009 | Basler et al. |
| 2009/0222496 A1 | 9/2009 | Liu et al. |
| 2009/0228669 A1 | 9/2009 | Siesarev et al. |
| 2009/0234892 A1 | 9/2009 | Anglin et al. |
| 2009/0240904 A1 | 9/2009 | Austruy et al. |
| 2009/0248762 A1 | 10/2009 | Prahlad et al. |
| 2009/0249005 A1 | 10/2009 | Bender et al. |
| 2009/0282404 A1 | 11/2009 | Khandekar et al. |
| 2009/0287665 A1 | 11/2009 | Prahlad |
| 2009/0300023 A1 | 12/2009 | Vaghani |
| 2009/0300057 A1 | 12/2009 | Friedman |
| 2009/0307166 A1 | 12/2009 | Routray et al. |
| 2009/0313260 A1 | 12/2009 | Mimatsu |
| 2009/0313447 A1 | 12/2009 | Nguyen et al. |
| 2009/0313503 A1 | 12/2009 | Atluri et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320137 A1 | 12/2009 | White et al. |
| 2009/0327471 A1 | 12/2009 | Astete et al. |
| 2009/0327477 A1 | 12/2009 | Madison, Jr. et al. |
| 2010/0011178 A1 | 1/2010 | Feathergill |
| 2010/0017647 A1 | 1/2010 | Callaway et al. |
| 2010/0030984 A1 | 2/2010 | Erickson |
| 2010/0049929 A1 | 2/2010 | Nagarkar et al. |
| 2010/0049930 A1 | 2/2010 | Pershin |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0070726 A1 | 3/2010 | Ngo et al. |
| 2010/0082672 A1 | 4/2010 | Kottomtharayil |
| 2010/0094948 A1 | 4/2010 | Ganesh et al. |
| 2010/0106691 A1 | 4/2010 | Preslan et al. |
| 2010/0107158 A1 | 4/2010 | Chen et al. |
| 2010/0107172 A1 | 4/2010 | Calinescu et al. |
| 2010/0161919 A1 | 6/2010 | Dodgson et al. |
| 2010/0186014 A1 | 7/2010 | Vaghani et al. |
| 2010/0211829 A1 | 8/2010 | Ziskind et al. |
| 2010/0218183 A1 | 8/2010 | Wang et al. |
| 2010/0228913 A1 | 9/2010 | Czezatke et al. |
| 2010/0242096 A1 | 9/2010 | Varadharajan et al. |
| 2010/0250767 A1 | 9/2010 | Barreto et al. |
| 2010/0257523 A1 | 10/2010 | Frank |
| 2010/0262586 A1 | 10/2010 | Rosikiewicz et al. |
| 2010/0262794 A1 | 10/2010 | De Beer et al. |
| 2010/0274981 A1 | 10/2010 | Ichikawa |
| 2010/0280999 A1 | 11/2010 | Atluri et al. |
| 2010/0299309 A1 | 11/2010 | Maki et al. |
| 2010/0299666 A1 | 11/2010 | Agbaria et al. |
| 2010/0306173 A1 | 12/2010 | Frank |
| 2010/0306486 A1 | 12/2010 | Balasubramanian et al. |
| 2010/0325471 A1 | 12/2010 | Mishra et al. |
| 2010/0325727 A1 | 12/2010 | Neystadt et al. |
| 2010/0332401 A1 | 12/2010 | Prahlad |
| 2010/0332454 A1 | 12/2010 | Prahlad et al. |
| 2010/0332456 A1 | 12/2010 | Prahlad et al. |
| 2010/0332479 A1 | 12/2010 | Prahlad |
| 2010/0332629 A1 | 12/2010 | Cotugno et al. |
| 2010/0332818 A1 | 12/2010 | Prahlad |
| 2010/0333100 A1 | 12/2010 | Miyazaki et al. |
| 2010/0333116 A1 | 12/2010 | Prahlad |
| 2011/0004586 A1 | 1/2011 | Cherryholmes et al. |
| 2011/0010515 A1 | 1/2011 | Ranade |
| 2011/0016467 A1 | 1/2011 | Kane |
| 2011/0022811 A1 | 1/2011 | Kirihata et al. |
| 2011/0023114 A1 | 1/2011 | Diab et al. |
| 2011/0035620 A1 | 2/2011 | Elyashev et al. |
| 2011/0047541 A1 | 2/2011 | Yamaguchi et al. |
| 2011/0061045 A1 | 3/2011 | Phillips |
| 2011/0072430 A1 | 3/2011 | Mani |
| 2011/0087632 A1 | 4/2011 | Subramanian et al. |
| 2011/0093471 A1 | 4/2011 | Brockway et al. |
| 2011/0107025 A1 | 5/2011 | Urkude et al. |
| 2011/0107331 A1 | 5/2011 | Evans et al. |
| 2011/0161299 A1 | 6/2011 | Prahlad |
| 2011/0179414 A1 | 7/2011 | Goggin et al. |
| 2011/0185355 A1 | 7/2011 | Chawla et al. |
| 2011/0191559 A1 | 8/2011 | Li et al. |
| 2011/0202728 A1 | 8/2011 | Nichols et al. |
| 2011/0202734 A1 | 8/2011 | Dhakras et al. |
| 2011/0208928 A1 | 8/2011 | Chandra et al. |
| 2011/0213754 A1 | 9/2011 | Bindal |
| 2011/0219144 A1 | 9/2011 | Amit et al. |
| 2011/0225277 A1 | 9/2011 | Freimuth et al. |
| 2011/0239013 A1 | 9/2011 | Muller |
| 2011/0246430 A1 | 10/2011 | Prahlad et al. |
| 2011/0252208 A1 | 10/2011 | Ali et al. |
| 2011/0264786 A1 | 10/2011 | Kedem et al. |
| 2012/0016840 A1 | 1/2012 | Lin et al. |
| 2012/0017027 A1 | 1/2012 | Baskakov et al. |
| 2012/0017043 A1 | 1/2012 | Aizman et al. |
| 2012/0017114 A1 | 1/2012 | Timashev et al. |
| 2012/0054736 A1 | 3/2012 | Arcese et al. |
| 2012/0072685 A1 | 3/2012 | Otani |
| 2012/0079221 A1 | 3/2012 | Sivasubramanian et al. |
| 2012/0084262 A1 | 4/2012 | Dwarampudi et al. |
| 2012/0084769 A1 | 4/2012 | Adi et al. |
| 2012/0096149 A1 | 4/2012 | Sunkara et al. |
| 2012/0110328 A1 | 5/2012 | Pate et al. |
| 2012/0131295 A1 | 5/2012 | Nakajima |
| 2012/0131578 A1 | 5/2012 | Ciano et al. |
| 2012/0136832 A1 | 5/2012 | Sadhwani |
| 2012/0137292 A1 | 5/2012 | Iwamatsu et al. |
| 2012/0150815 A1 | 6/2012 | Parfumi |
| 2012/0150818 A1 | 6/2012 | Vijayan Retnamma et al. |
| 2012/0150826 A1 | 6/2012 | Vijayan Retnamma et al. |
| 2012/0151084 A1 | 6/2012 | Stathopoulos et al. |
| 2012/0159232 A1 | 6/2012 | Shimada et al. |
| 2012/0167083 A1 | 6/2012 | Suit |
| 2012/0209812 A1 | 8/2012 | Bezbaruah |
| 2012/0221843 A1 | 8/2012 | Bak et al. |
| 2012/0233285 A1 | 9/2012 | Suzuki |
| 2012/0254119 A1 | 10/2012 | Kumarasamy et al. |
| 2012/0254364 A1 | 10/2012 | Vijayan |
| 2012/0254824 A1 | 10/2012 | Bansold |
| 2012/0278287 A1 | 11/2012 | Wilk |
| 2012/0278571 A1 | 11/2012 | Fleming et al. |
| 2012/0278799 A1 | 11/2012 | Starks et al. |
| 2012/0290802 A1 | 11/2012 | Wade et al. |
| 2012/0324183 A1 | 12/2012 | Chiruvolu et al. |
| 2012/0331248 A1 | 12/2012 | Kono et al. |
| 2013/0024641 A1 | 1/2013 | Talagala et al. |
| 2013/0024722 A1 | 1/2013 | Kotagiri |
| 2013/0036418 A1 | 2/2013 | Yadappanavar et al. |
| 2013/0042234 A1 | 2/2013 | Deluca et al. |
| 2013/0047156 A1 | 2/2013 | Jian et al. |
| 2013/0054533 A1 | 2/2013 | Hao et al. |
| 2013/0061014 A1 | 3/2013 | Prahlad et al. |
| 2013/0074181 A1 | 3/2013 | Singh |
| 2013/0080841 A1 | 3/2013 | Reddy et al. |
| 2013/0086580 A1 | 4/2013 | Simonsen et al. |
| 2013/0097308 A1 | 4/2013 | Le et al. |
| 2013/0117744 A1 | 5/2013 | Klein et al. |
| 2013/0173771 A1 | 7/2013 | Ditto et al. |
| 2013/0204849 A1 | 8/2013 | Chacko |
| 2013/0227558 A1 | 8/2013 | Du et al. |
| 2013/0232215 A1 | 9/2013 | Gupta et al. |
| 2013/0232480 A1 | 9/2013 | Winterfeldt et al. |
| 2013/0238562 A1 | 9/2013 | Kumarasamy |

(56) References Cited

U.S. PATENT DOCUMENTS

| | | |
|---|---|---|
| 2013/0238785 A1 | 9/2013 | Hawk et al. |
| 2013/0262390 A1 | 10/2013 | Kumarasamy et al. |
| 2013/0262638 A1 | 10/2013 | Kumarasamy et al. |
| 2013/0262801 A1 | 10/2013 | Sancheti et al. |
| 2013/0263113 A1 | 10/2013 | Cavazza |
| 2013/0268931 A1 | 10/2013 | O'Hare et al. |
| 2013/0290267 A1 | 10/2013 | Dwarampudi et al. |
| 2013/0311429 A1 | 11/2013 | Agetsuma |
| 2013/0326260 A1 | 12/2013 | Wei et al. |
| 2013/0332685 A1 | 12/2013 | Kripalani |
| 2014/0006858 A1 | 1/2014 | Helfman et al. |
| 2014/0007097 A1 | 1/2014 | Chin et al. |
| 2014/0007181 A1 | 1/2014 | Sarin et al. |
| 2014/0019769 A1 | 1/2014 | Pittelko |
| 2014/0040892 A1 | 2/2014 | Baset et al. |
| 2014/0052892 A1 | 2/2014 | Klein et al. |
| 2014/0059380 A1 | 2/2014 | Krishnan |
| 2014/0075440 A1 | 3/2014 | Prahlad et al. |
| 2014/0089266 A1 | 3/2014 | Une et al. |
| 2014/0095816 A1 | 4/2014 | Hsu et al. |
| 2014/0115285 A1 | 4/2014 | Arcese et al. |
| 2014/0136803 A1 | 5/2014 | Qin |
| 2014/0156684 A1 | 6/2014 | Zaslavsky et al. |
| 2014/0181038 A1 | 6/2014 | Pawar et al. |
| 2014/0181044 A1 | 6/2014 | Pawar et al. |
| 2014/0181046 A1 | 6/2014 | Pawar et al. |
| 2014/0188803 A1 | 7/2014 | James et al. |
| 2014/0196038 A1 | 7/2014 | Kottomtharayil et al. |
| 2014/0196039 A1 | 7/2014 | Kottomtharayil et al. |
| 2014/0201151 A1 | 7/2014 | Kumarasamy et al. |
| 2014/0201157 A1 | 7/2014 | Pawar et al. |
| 2014/0201162 A1 | 7/2014 | Kumarasamy et al. |
| 2014/0201170 A1 | 7/2014 | Vijayan et al. |
| 2014/0237537 A1 | 8/2014 | Manmohan et al. |
| 2014/0244610 A1 | 8/2014 | Raman et al. |
| 2014/0259015 A1 | 9/2014 | Chigusa et al. |
| 2014/0278530 A1 | 9/2014 | Bruce et al. |
| 2014/0282514 A1 | 9/2014 | Carson et al. |
| 2014/0330874 A1 | 11/2014 | Novak et al. |
| 2014/0337295 A1 | 11/2014 | Haselton et al. |
| 2014/0344323 A1 | 11/2014 | Pelavin et al. |
| 2014/0344805 A1 | 11/2014 | Shu et al. |
| 2014/0372384 A1 | 12/2014 | Long et al. |
| 2015/0058382 A1 | 2/2015 | St. Laurent |
| 2015/0067393 A1 | 3/2015 | Madani et al. |
| 2015/0074536 A1 | 3/2015 | Varadharajan et al. |
| 2015/0081636 A1 | 3/2015 | Schindler |
| 2015/0120928 A1 | 4/2015 | Gummaraju et al. |
| 2015/0121122 A1 | 4/2015 | Towstopiat et al. |
| 2015/0134607 A1 | 5/2015 | Magdon-Ismail et al. |
| 2015/0142745 A1 | 5/2015 | Tekade et al. |
| 2015/0160884 A1 | 6/2015 | Scales et al. |
| 2015/0161015 A1 | 6/2015 | Kumarasamy et al. |
| 2015/0163172 A1 | 6/2015 | Mudigonda et al. |
| 2015/0212897 A1 | 7/2015 | Kottomtharayil |
| 2015/0227438 A1 | 8/2015 | Jaquette |
| 2015/0227602 A1 | 8/2015 | Ramu |
| 2015/0242283 A1 | 8/2015 | Simoncelli et al. |
| 2015/0248333 A1 | 9/2015 | Aravot |
| 2015/0293817 A1 | 10/2015 | Subramanian et al. |
| 2015/0317216 A1 | 11/2015 | Hsu et al. |
| 2015/0347165 A1 | 12/2015 | Lipchuk et al. |
| 2015/0347430 A1 | 12/2015 | Ghosh |
| 2015/0363413 A1 | 12/2015 | Ghosh |
| 2015/0366174 A1 | 12/2015 | Burova et al. |
| 2015/0370652 A1 | 12/2015 | He et al. |
| 2015/0378758 A1 | 12/2015 | Duggan et al. |
| 2015/0378771 A1 | 12/2015 | Tarasuk-Levin |
| 2015/0378833 A1 | 12/2015 | Misra et al. |
| 2015/0378849 A1 | 12/2015 | Liu et al. |
| 2015/0381711 A1 | 12/2015 | Singh et al. |
| 2016/0004721 A1 | 1/2016 | Iyer |
| 2016/0019317 A1 | 1/2016 | Pawar et al. |
| 2016/0070623 A1 | 3/2016 | Derk |
| 2016/0092467 A1 | 3/2016 | Lee et al. |
| 2016/0132400 A1 | 5/2016 | Pawar et al. |
| 2016/0154709 A1 | 6/2016 | Mitkar et al. |
| 2016/0170844 A1 | 6/2016 | Long et al. |
| 2016/0188413 A1 | 6/2016 | Abali et al. |
| 2016/0202916 A1 | 7/2016 | Cui et al. |
| 2016/0283335 A1 | 9/2016 | Yao et al. |
| 2016/0306651 A1 | 10/2016 | Kripalani |
| 2016/0306706 A1 | 10/2016 | Pawar et al. |
| 2016/0308722 A1 | 10/2016 | Kumarasamy et al. |
| 2016/0335007 A1 | 11/2016 | Ryu et al. |
| 2016/0350391 A1 | 12/2016 | Vijayan et al. |
| 2016/0373291 A1 | 12/2016 | Dornemann |
| 2017/0090972 A1 | 3/2017 | Ryu et al. |
| 2017/0090974 A1 | 3/2017 | Dornemann |
| 2017/0123939 A1 | 5/2017 | Maheshwari et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0249220 A1 | 8/2017 | Kumarasamy et al. |
| 2017/0262204 A1 | 9/2017 | Dornemann et al. |
| 2017/0264589 A1 | 9/2017 | Hunt et al. |
| 2017/0286230 A1 | 10/2017 | Zamir |
| 2017/0318111 A1 | 11/2017 | Dornemann |
| 2017/0371547 A1 | 12/2017 | Fruchtman et al. |
| 2018/0067955 A1 | 3/2018 | Pawar et al. |
| 2018/0089031 A1 | 3/2018 | Dornemann et al. |
| 2018/0095846 A1 | 4/2018 | Sanakkayala et al. |
| 2018/0113623 A1 | 4/2018 | Sancheti |
| 2018/0143880 A1 | 5/2018 | Dornemann |
| 2018/0181598 A1 | 6/2018 | Pawar et al. |
| 2018/0253192 A1 | 9/2018 | Varadharajan et al. |
| 2018/0267861 A1 | 9/2018 | Iyer |
| 2018/0276022 A1 | 9/2018 | Mitkar et al. |
| 2018/0276083 A1 | 9/2018 | Mitkar et al. |
| 2018/0276084 A1 | 9/2018 | Mitkar et al. |
| 2018/0276085 A1 | 9/2018 | Mitkar et al. |
| 2018/0285202 A1 | 10/2018 | Bhagi et al. |
| 2018/0285209 A1 | 10/2018 | Liu |
| 2018/0285215 A1 | 10/2018 | Ashraf |
| 2018/0285353 A1 | 10/2018 | Rao et al. |
| 2018/0329636 A1 | 11/2018 | Dornemann et al. |
| 2019/0012339 A1 | 1/2019 | Kumarasamy et al. |
| 2019/0026187 A1 | 1/2019 | Gulam et al. |
| 2019/0065069 A1 | 2/2019 | Sancheti et al. |
| 2019/0090305 A1 | 3/2019 | Hunter et al. |
| 2019/0324791 A1 | 10/2019 | Kripalani |
| 2019/0340088 A1 | 11/2019 | Sanakkayala et al. |
| 2019/0347120 A1 | 11/2019 | Kottomtharayil et al. |
| 2019/0369901 A1 | 12/2019 | Dornemann et al. |
| 2019/0391742 A1 | 12/2019 | Bhagi et al. |
| 2020/0034252 A1 | 1/2020 | Mitkar et al. |
| 2020/0142612 A1 | 5/2020 | Dornemann et al. |
| 2020/0142782 A1 | 5/2020 | Dornemann |
| 2020/0142783 A1 | 5/2020 | Dornemann |
| 2020/0174894 A1 | 6/2020 | Dornemann |
| 2020/0174895 A1 | 6/2020 | Dornemann |
| 2020/0183728 A1 | 6/2020 | Deshpande et al. |
| 2020/0241908 A1 | 7/2020 | Dornemann et al. |
| 2020/0265024 A1 | 8/2020 | Pawar et al. |
| 2020/0301891 A1 | 9/2020 | Dornemann |
| 2020/0327163 A1 | 10/2020 | Pawar et al. |
| 2020/0334113 A1 | 10/2020 | Sanakkayala et al. |
| 2020/0334221 A1 | 10/2020 | Prahlad et al. |
| 2020/0341945 A1 | 10/2020 | Pawar et al. |

FOREIGN PATENT DOCUMENTS

| | | |
|---|---|---|
| EP | 0467546 A2 | 1/1992 |
| EP | 0541281 A2 | 5/1993 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |

(56) References Cited

FOREIGN PATENT DOCUMENTS

| WO | WO 95/13580 | 5/1995 |
|---|---|---|
| WO | WO 99/12098 | 3/1999 |
| WO | WO 2006/052872 | 5/2006 |

OTHER PUBLICATIONS

Bastiaansen, "Robs Guide to Using VMWare: Covers Workstation, ACE, GSX and ESX Server", Second Edition, reviewed Amazon.com, printed on Mar. 22, 2021 in 5 pages.
Bastiaansen, "Robs Guide to Using VMWare: Covers Workstation, ACE, GSX and ESX Server", Second Edition, Sep. 2005 in 28 pages.
Braswell, et al., Abstract for "Server Consolidation with VMwareESX Server", IBM Redpaper, Jan. 2005 in 2 pages.
Brooks, "esxRanger Ably Backs Up VMs", eWeek, May 2, 2007 in 6 pages.
Carrier, "File System Forensic Analysis", Pearson Education, 2005 in 94 pages.
Commvaul t, "Automatic File System Multi-Streaming," http://documentation.commvault.com/hds/release 700/booksonline 1/english us/feature, downloaded Jun. 4, 2015, 4 pages.
Cover and table of contents for Cluster Computing, vol. 9, Issue 1, Jan. 2006 in 5 pages.
Dell Power Solutions, Dell, Inc., Aug. 2007 in 21 pages.
Doering, et al., "Guide to Novell NetWare 5.0 5.1 Network Administration", Course Technology, 2001 in 40 pages.
Edwards, "Discovery Systems in Ubiquitous Computing", IEEE Pervasive Computing, issue vol. 5, No. 2, Apr.-Jun. 2006 in 8 pages.
EsxRanger can not connect to VirtualCentre, VMware Technology Network community message board thread, Jun. 28, 2007 in 2 pages.
EsxRanger Professional, version 3.15, Reference Manual, Copyright Vizioncore Inc, 2006 in 102 pages.
EsxRanger Professional, version 3.15, Reference Manual, Copyright Vizioncore Inc, 2006 in 103 pages.
U.S. Pat. No. 9,740,723 in 594 pages.
Gourley et al., "HTTP The Definitive Guide", O' Reilly, 2002, in 77 pages.
Guttman et al., "Service Templates and Services Schemes", RFC2609, Standards Track, Jun. 1999 in 33 pages.
Howorth, Vizioncore esxEssentials Review, ZDNet, Aug. 21, 2007 in 12 pages.
InformationWeek, Issue 1, 101, Aug. 14, 2006 in 17 pages.
Infoworld, vol. 28, Issue 7, Feb. 13, 2006 in 17 pages.
InfoWorld, vol. 28, Issue 10, Mar. 6, 2006 in 18 pages.
InfoWorld, vol. 28, Issue 15, Apr. 10, 2006 in 18 pages.
InfoWorld, vol. 28, Issue 16, Apr. 17, 2006 in 4 pages.
InfoWorld, vol. 28, Issue 18, May 1, 2006 in 15 pages.
InfoWorld, vol. 28, Issue 39, Sep. 25, 2006 in 19 pages.
InfoWorld, vol. 29, Issue 6, Feb. 5, 2007 in 22 pages.
InfoWorld, vol. 29, Issue 7, Feb. 12, 2007 in 20 pages.
IT Professional Technology Solutions for the Enterprise, IEEE Computer Society, vol. 9, No. 5, Sep.-Oct. 2007 in 11 pages.
Listing of Reviews on ZDNet.com in 33 pages.
Little et al., "Digital Data Integrity", Wiley, 2007 in 24 pages.
Microsoft Computer Dictionary, Microsoft Press, 5th edition, 2002 in 3 pages.
Muller, "Scripting Vmware™: Power Tools Automating Virtual Infrastructure Administration", Syngress, 2006 in 66 pages.
Muller et al., "Scripting Vmware™: Power Tools Automating Virtual Infrastructure Administration", Syngress, 2006 in 19 pages.
Newman, et.al, "Server Consolidation with VMware ESX Server", IBM Redpaper, Jan. 12, 2005 in 159 pages.
Results of search for Roger Howorth on ZDNet.com in 3 pages.
Rosenblum et al. "Virtual Machine Monitors Current Technology and Future Trends", IEEE, May 2005 in 9 pages.
Rule, Jr., "How to Cheat at Configuring VMware ESX Server", Elsevier, Inc., 2007 in 16 pages.
Sriram Subramaniam et al., Snapshots in a Flash with ioSnap, In Proceedings of the Ninth European Conference on Computer Systems (EuroSys '14), Association for Computing Machinery, New York, NY, USA, Article 23, pp. 1-14, DOI:https://doi.org/10.1145/2592798.2592824 (Year: 2014).
Techopedia. "Restore Point". Jan. 13, 2012 snapshot via Archive.org. URL Link: <https://www.techopedia.com/definition/13181/restore-point>. Accessed Jul. 2019. (Year: 2012).
TechTarget. "raw device mapping (RDM)". Last updated Feb. 2012. URL Link: <https://searchvmware.techtarget.com/definition/raw-device-mapping-RDM>. Accessed Jul. 2019. (Year: 2012).
TechTarget News, Week of May 20, 2007 "Moonwalk's plans to float over the chasm" in 39 pages.
"Vizioncore Inc. Releases First Enterprise-Class Hot Backup and Recovery Solution for VMware Infrastructure 3", Business Wire, Aug. 31, 2006 in 2 pages.
"Vizioncore Offers Advice to Help Users Understand VCB for VMware Infrastructure 3", Business Wire, Jan. 23, 2007 in 3 pages.
VMware VirtualCenter Users Manual, Version 1.2, Copyright 1998-2004 VMware, Inc.in 466 pages.
VMware White Paper, "Virtualization Overview", Copyright 2005, VMware, Inc., 11 pages.
Vmware White Paper, "VMware Infrastructure 3, Consolidated Backup in VMware Infrastructure 3", Vmware, Inc. in 6 pages.
VMware White Paper, "Understanding VMware Consolidated Backup", Copyright 2007, VMware, Inc., in 11 pages.
Wolf, "Lets Get Virtual A Look at Todays Server Virtualization Architectures", Data Center Strategies, Burton Group, Version 1.0, May 14, 2007 in 42 pages.
Zhao, et al., Abstract for "Distributed File System Virtualization Techniques Supporting On-Demand Virtual Machine Environments for Grid Computing", Cluster Computing, 9, pp. 45-56, 2006.
Zhao, et al., "Distributed File System Virtualization Techniques Supporting On-Demand Virtual Machine Environments for Grid Computing", Cluster Computing, 9, pp. 45-56, 2006.
International Preliminary Report on Patentability and Written Opinion for PCT/US2011/054374, dated Apr. 11, 2013, 6 pages.
International Search Report and Written Opinion for PCT/US2011/054378, dated May 2, 2012, 9 pages.
Affidavit of Duncan Hall and Exhibit B in regarding of Internet Archive on Mar. 3, 2021 in 16 pages.
First Affidavit of Duncan Hall and Exhibit A in regarding of Internet Archive on Jan. 20, 2021 in 106 pages.
Second Affidavit of Duncan Hall and Exhibit A in regarding of Internet Archive on Jan. 27, 2021 in 94 pages.
Complaint for Patent Infringement, *Commvault Systems, Inc.*, Plaintiff, v. *Rubrik Inc.*, Defendant, Case No. 1:20-cv-00524-MN, U.S. District Court, District of Delaware, filed on Apr. 21, 2020 in 29 pages.
*Commvault Systems, Inc.* v. *Cohesity Inc.*, Civil Action No. 1:20-cv-00525, U.S. District Court, District of Delaware, Complaint filed on Apr. 21, 2020.
Declaration of Benjamin Dowell in support of Petition for Inter Partes Review of U.S. Pat. No. 9,740,723, *Rubrik, Inc.*, Petitioners, v. *Commvault Systems*, Inc., Patent Owner, dated Oct. 15, 2020, in 3 pages.
Declaration of Dr. H.V. Jagadish in support of Petition for Inter Partes Review of U.S. Pat. No. 9,740,723, *Rubrik, Inc.*, Petitioner v. *Commvault Systems, Inc.*, Patent Owner, dated Mar. 31, 2021, in 200 pages.
Declaration of Dr. H.V. Jagadish in support of Petition for Inter Partes Review of U.S. Pat. No. 9,740,723, *Rubrik, Inc.*, Petitioner v. *Commvault Systems, Inc.*, Patent Owner, dated Mar. 16, 2021, in 191 pages.
Declaration of Sylvia Hall-Ellis, Ph.D. in support of Petition for Inter Partes Review of U.S. Pat. No. 9,740,723, *Rubrik, Inc.*, Petitioner v. *Commvault Systems, Inc.*, Patent Owener, dated Feb. 15, 2021, in 55 pages.
Declaration of Sylvia Hall-Ellis, Ph.D. in support of Petition for Inter Partes Review of U.S. Pat. No. 9,740,723, *Rubrik, Inc.*, Petitioner v. *Commvault Systems, Inc.*, Patent Owner, dated Mar. 30, 2021, in 291 pages.

(56) References Cited

OTHER PUBLICATIONS

Petitioner's Explanation of Multiple Petitions Challenging U.S. Pat. No. 9,740,723, filed by petitioner *Rubrick, Inc.*, Petitioner v. *Commvault Systems, Inc.*, Patent Owner, Case No. IPR2021-00674, dated Mar. 31, 2021, in 9 pages.
Petition for Inter Partes Review of U.S. Pat. No. 9,740,723, filed by petitioner *Rubrick, Inc.*, Petitioner v. *Commvault Systems, Inc.*, Patent Owner, Case No. IPR2021-00674, dated Mar. 31, 2021, in 87 pages.
Petition for Inter Partes Review of U.S. Pat. No. 9,740,723, filed by petitioner *Rubrick, Inc.*, Petitioner v. *Commvault Systems, Inc.*, Patent Owner, Case No. IPR2021-00673, dated Mar. 17, 2021, in 98 pages.
Scheduling Order, *Commvault Systems, Inc.*, Plaintiff v. *Rubrik, Inc.*, Case No. 1:20-cv-00524-MN, filed Feb. 17, 2021 in 15 pages.
Pawar, et al., U.S. Appl. No. 13/930,795 Published As 2014/0181045 A1 Now U.S. Pat. No. 9,740,702, filed Jun. 28, 2013, Systems And Methods To Identify Unprotected Virtual Machines.
Pawar, et al., U.S. Appl. No. 13/930,918 Published As 2014/0181038 A1 Abandoned, filed Jun. 28, 2013, Systems And Methods To Categorize Unprotected Virtual Machines.
Pawar, et al., U.S. Appl. No. 13/930,599 Published As 2014/0181044 A1 Abandoned, filed Jun. 28, 2013, Systems And Methods To Identify Uncharacterized And Unprotected Virtual Machines.
Pawar, et al., U.S. Appl. No 13/930,826 Published As 2014/0181046 A1 Abandoned, filed Jun. 28, 2013, Systems And Methods To Backup Unprotected Virtual Machines.
Pawar, et al., U.S. Appl. No. 15/670,381 Published As 2018/0067955 A1 Now U.S. Pat. No. 10,733,143, filed Aug. 7, 2017, Systems And Methods To Identify Unprotected Virtual Machines.
Pawar, et al., U.S. Appl. No. 16/925,179 Published As 2020/0341945 A1, filed Jul. 9, 2020, Systems And Methods To Identify Unprotected Virtual Machines.
U.S. Appl. No. 16/262,753, filed Jan. 30, 2019, Dornemann et al.
Armstead et al., "Implementation of a Campus-wide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Brandon, J., "Virtualization Shakes Up Backup Strategy," <http://www.computerworld.com>, Feb. 21, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Celesti, et al., "Improving Virtual Machine Migration in Federated Cloud Environments", 2010, pp. 61-67.
Chan, et al., "An Approach to High Availability for Cloud Servers with Snapshot Mechanism," 2012, pp. 1-6.
Chen et al., "When Virtual Is Better Than Real", IEEE 2001, pp. 133-138.
Chervenak, et al., "Protecting File Systems—A Survey of Backup Techniques," 1998, pp. 17-31.
Chiappetta, Marco, "ESA Enthusiast System Architecture," <http://hothardware.com/Articles/NVIDIA—ESA—Enthusiast—System—Architecture/>, Nov. 5, 2007, 2 pages.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, accessed Apr. 30, 2014, 1 page.
CommVault Systems, Inc., "Enhanced Protection and Manageability of Virtual Servers," Partner Solution Brief, 2008, 6 pages.
Cully, et al., "Remus: High Availability via Asynchronous Virtual Machine Replication", 2008, pp. 161-174.
Data Protection for Large Vmware and Vblock Environments Using EMC Avamar Applied Technology, Nov. 2010, EMC Corporation, 26 pages.
Davis, D., "3 VMware Consolidated Backup (VCB) Utilities You Should Know," Petri IT Knowlegebase, <http://www.petri.co.il/vmware-consolidated-backup-utilities.htm>, Nov. 16, 2007, 3 pages.
Davis, D., "Understanding VMware VMX Configuration Files," Petri IT Knowledgebase, <http://www.petri.co.il/virtual_vmware_vmx_configuration_files.htm>, Nov. 16, 2007, 3 pages.
Davis, D., "VMware Server & Workstation Disk Files Explained," Petri IT Knowledgebase, <http://www.petri.co.il/virtual_vmware_files_explained.htm>, May 3, 2008, 3 pages.
Davis, D., "VMware Versions Compared," Petri IT Knowledgebase, <http://www.petri.co.il/virtual_vmware_versions_compared.htm>, Nov. 16, 2007, 3 pages.
Deng, et al., "Fast Saving and Restoring Virtual Machines with Page Compression", 2011, pp. 150-157.
Eitel, "Backup and Storage Management in Distributed Heterogeneous Environments," IEEE, Jun. 12-16, 1994, pp. 124-126.
Eldos Callback File System product information from https://www.eldos.com/clients/104-345.php retrieved on Dec. 30, 2016 in 2 pages.
Eldos Usermode filesystem for your Windows applications—Callback File System® (CBFS®)—Create and manage virtual filesystems and disks from your Windows applications retrieved from https://eldos.com/cbfs on Dec. 30, 2016 in 4 pages.
Fraser, et al., "Safe Hardware Access With the Xen Virtual Machine Monitor", 1st Workshop on Operating System and Architectural Support for the demand IT Infrastructure (OASIS), 2004, pp. 1-10.
Gait, "The Optical File Cabinet: A Random-Access File System for Write-Once Optical Disks," IEEE Computer, vol. 21, No. 6, pp. 11-22 (Jun. 1988) (see in particular figure 5 in p. 15 and recitation in claim 5).
Galan et al. "Service Specification in Cloud Environments Based on Extension to Oper Standards" COMSWARE Jun. 16-19, 2009 Dublin, Ireland ACM.
Gibson, et al., "Implementing Preinstallation Environment Media for Use in User Support," 2007, pp. 129-130.
Granger, et al., "Survivable Storage Systems", 2001, pp. 184-195.
Gupta, et al., "GPFS-SNC: An enterprise storage framework for virtual-machine clouds", 2011, pp. 1-10.
Haselhorst, et al., "Efficient Storage Synchronization for Live Migration in Cloud Infrastructures", 2011, pp. 511-518.
Hirofuchio, Takahiro et al., "A live storage migration mechanism over wan and its performance evaluation," 2009, pp. 67-74.
Hirofuchi, et al., "Enabling Instantaneous Relocation of Virtual Machines with a Lightweight VMM Extension", 2010, pp. 73-83.
Hu, et al., "Virtual Machine based Hot-spare Fault-tolerant System", 2009, pp. 429-432.
Hu, Wenjin et al., "A Quantitative Study of Virtual Machine Live Migration," 2013, pp. 1-10.
Huff, "Data Set Usage Sequence Number," IBM Technical Disclosure Bulletin, vol. 24, No. 5, Oct. 1981 New York, US, pp. 2404-2406.
Ibrahim, Shadi et al., "CLOUDLET: Towards MapReduce Implementation on Virtual Machines," 2009, pp. 65-66.
Ismail et al., Architecture of Scalable Backup Service For Private Cloud, IEEE 2013, pp. 174-179.
Jander, "Launching Storage-Area Net," Data Communications, US, McGraw Hill, NY, vol. 27, No. 4 (Mar. 21, 1998), pp. 64-72.
Javaraiah, et al., "Backup for Cloud and Disaster Recovery for Consumers and SMBs," 2008, pp. 1-3.
Jhawar et al., "Fault Tolerance Management in Cloud Computing: A System-Level Perspective", IEEE Systems Journal 7.2, 2013, pp. 288-297.
Jo, et al., "Efficient Live Migration of Virtual Machines Using Shared Storage", 2013, pp. 1-10.
Kashyap "RLC—A Reliable approach to Fast and Efficient Live Migration of Virtual Machines in the Clouds" IEEE 2014 IEEE Computer Society.
Kim, et al., "Availability Modeling and Analysis of a Virtualized System," 2009, pp. 365-371.

(56) References Cited

OTHER PUBLICATIONS

Kuo, et al., "A Hybrid Cloud Storage Architecture for Service Operational High Availability", 2013, pp. 487-492.
Li et al. "Comparing Containers versus Virtual Machines for Achieving High Availability" 2015 IEEE.
Liang, et al., "A virtual disk environment for providing file system recovery", 2006, pp. 589-599.
Lu et al.. "Virtual Machine Memory Access Tracing with Hypervisor Exclusive Cache", Usenix Annual Technical Conference, 2007, pp. 29-43.
Mao, et al., "Read-Performance Optimization for Deduplication-Based Storage Systems in the Cloud", 2014, pp. 1-22.
Microsoft Corporation, "How NTFS Works," Windows Server TechCenter, <http://technet2.mircrosoft.com/windowsserver/en/library/8cc5891d-bf8e-4164-862d-dac5418c5948 . . . >, updated Mar. 28, 2003, internet accessed Mar. 26, 2008, 26 pages.
Migrate a Virtual Machine with Storage vMotion in the vSphere Client. http://pubs.vmware.com/vsphere-51/advanced/print/jsp?topic=/com.vmware.vsphere.vcent . . . Retrieved Aug. 12, 2014; 2 pages.
Nance et al., "Virtual Machine Introspection: Observation or Interference?", 2008 IEEE.
Ng, Chun-Ho et al., "Live Deduplication Storage of Virtual Machine Images in an Open-Source Cloud," 2011, pp. 80-99.
Nicolae, Bogdan et al., "A Hybrid Local Storage Transfer Scheme for Live Migration of I/0 Intensive Workloads," 2012, pp. 85-96.
Reingold, B. et al., "Cloud Computing: The Intersection of Massive Scalability, Data Security and Privacy (Part I)," LegalWorks, a Thomson Business, Jun. 2009, 5 pages.
Reingold, B. et al., "Cloud Computing: Industry and Government Developments (Part II)," LegalWorks, Sep. 2009, 5 pages.
Reingold, B. et al., "Cloud Computing: Whose Law Governs the Cloud? (Part III)," LegalWorks, Jan.-Feb. 2010, 6 pages.
Rosenblum et al., "The Design and Implementation of a Log-Structured File System," Operating Systems Review SIGOPS, vol. 25, No. 5, New York, US, pp. 1-15 (May 1991).
Sanbarrow.com, "Disktype-table," <http://sanbarrow.com/vmdk/disktypes.html>, internet accessed on Apr. 30, 2014, 4 pages.
Sanbarrow.com, "Files Used by a VM," <http://sanbarrow.com/vmx/vmx-files-used-by-a-vm.html>, internet accessed on Apr. 30, 2014, 1 page.
Sanbarrow.com, "Monolithic Versus Split Disks," <http://sanbarrow.com/vmdk/monolithicversusspllit.html>, internet accessed on Jul. 14, 2008, 2 pages.
Somasundaram et al., Information Storage and Management. 2009, pp. 251-281.
Tran, et al., "Efficient Cooperative Backup with Decentralized Trust Management", 2012, pp. 1-25.
Travostino, et al., "Seamless live migration of virtual machines over the MAN/WAN", 2006, pp. 901-907.
Tudoran, Radu et al., "Adaptive File Management for Scientific Workflows on the Azure Cloud," 2013, pp. 273-281.
Vaghani, "Virtual Machine File System", 2010, pp. 57-70.
VMware, Inc., "VMware Solution Exchange (VSX)" <http://www.vmware.com/appliances/learn/ovf.html>, 2014, 3 pages.
VMware, Inc., "OVF, Open Virtual Machine Format Specification, version 0.9," White Paper, <http://www.vmware.com>, Sep. 7, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, accessed Apr. 30, 2014, 11 pages.
Vmware, Inc., "Using VMware Infrastructure for Backup and Restore," Best Practices, <http://www.vmware.com>, accessed Apr. 30, 2014, 20 pages.
Vmware, Inc., "Virtual Disk API Programming Guide," <http://www.vmware.com>, Revision Apr. 11, 2008, 2008, 44 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "VMware Consolidated Backup," Product Datasheet, <http://www.vmware.com>, 2009, 2 pages.
VMware, Inc., "VMware Consolidated Backup, Improvements in Version 3.5," Information Guide, <http://www.vmware.com>, accessed Apr. 30, 2014, 11 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, 2008, 2 pages.
VMware, Inc., "VMware OVF Tool," Technical Note, <http://www.vmware.com>, 2007, 4 pages.
VMware, Inc., "VMware Workstation 5.0, Snapshots in a Process Tree," <http://www.vmware.com/support/ws5/doc/ws_preserve_sshot_tree.html>, accessed Apr. 30, 2014, 1 page.
VMware, Inc., "VMware Workstation 5.0, Snapshots in a Linear Process," <http:/www.vmware.com/support/ws5/doc/ws_preserve_sshot_linear.html>, internet accessed on 2014, 1 page.
VMware, Inc., "VMware Workstation 5.5, What Files Make Up a Virtual Machine?" <http://www.vmware.com/support/ws55/doc/ws_learning_files_in_a_vm.html>, 2014, 2 pages.
VMware Storage VMotion—Non-Disruptive Live Migration for Virtual Machine Storage Disk Files. Copyright 2009 VMware, Inc.; 2 pages.
Vrable, et al., "Cumulus: Filesystem Backup to the Cloud", 2009, pp. 1-28.
VSphere Storage vMotion: Storage Management & Virtual Machine Migration. http://www.vmware.com/products /vsphere/features/storage-vmotion Retrieved Aug. 12, 2014; 6 pages.
Wikipedia, "Cloud computing," <http://en.wikipedia.org/wiki/Cloud—computing>, 2009, 11 pages.
Wikipedia, "Cluster (file system)," <http://en.wikipedia.org/wiki/Cluster_%28file_system%29>, Sep. 2, 2008, 1 page.
Wikipedia, "Cylinder-head-sector," <http://en.wikipedia.org/wiki/Cylinder-head-sector>, Jan. 4, 2009, 6 pages.
Wikipedia, "File Allocation Table," <http://en.wikipedia.org/wiki/File_Allocation_Table>, Dec. 3, 2008, 12 pages.
Wikipedia, "Logical Disk Manager," <http://en.wikipedia.org/wiki/Logical_Disk_Manager>, Nov. 16, 2007, 3 pages.
Wikipedia, "Logical Volume Management," <http://en.wikipedia.org/wiki/Logical_volume_management>, Oct. 27, 2008, 3 pages.
Wikipedia, "Storage Area Network," <http://en.wikipedia.org/wiki/Storage_area_network>, Dec. 5, 2008, 5 pages.
Wikipedia, "Virtualization," <http://en.wikipedia.org/wiki/Virtualization>, Apr. 29, 2014, 7 pages.
Wood, et al., "Disaster Recovery as a Cloud Service: Economic Benefits & Deployment Challenges", 2010, pp. 1-7.
Yang, et al., "Toward Reliable Data Delivery for Highly Dynamic Mobile Ad Hoc Networks," 2012, pp. 111-124.
Yang, et al., "TRAP-Array: A Disk Array Architecture Providing Timely Recovery to Any Point-in-time," 2006, pp. 1-12.
Yoshida et al., "Orthros: A High-Reliability Operating System with Transmigration of Processes," 2013, pp. 318-327.
Zhao, et al., "Adaptive Distributed Load Balancing Algorithm based on Live Migration of Virtual Machines in Cloud", 2009, pp. 170-175.
Zhao, et al., Supporting Application-Tailored Grid File System Sessions with WSRF-Based Services, Advanced Computing and Information Systems Laboratory (ACIS), pp. 24-33.
International Search Report and Written Opinion for PCT/US2011/054374, dated May 2, 2012, 7 pages.

(56) References Cited

OTHER PUBLICATIONS

International Preliminary Report on Patentability and Written Opinion for PCT/US2011/054374, dated Apr. 2, 2013, 9 pages.
Hitachi, "Create A Virtual Machine—VM Lifecycle Management—Vmware," http://documentation.commvault.com/hds/v10/article?p=-products/vs vmware/vm provisio . . . , downloaded Apr. 28, 2015, 2 pages.
Hitachi, "Frequently Asked Questions—Virtual Server Agent for Vmware," http://documentation.commvault.com/hds/v10/article?p=products/vs vmware/faqs.htm, downloaded Apr. 28, 2015, 11 pages.
Hitachi, "Overview—Virtual Server Agent for VMware," http://documentation.commvault.com/hds,v10/article?p=products/vs vmware/overview.htm, downloaded Apr. 28, 2015, 3 pages.
Hitachi, "Recover Virtual Machines or VM Files—Web Console," http://documentation.commvault.com/hds/v10/article7p+products/vs vmware/vm archivin . . . , downloaded Apr. 28, 2015, 2 pages.
PTAB-IPR2021-00674—Exhibit 1014—Rob's Guide to Using VMWare excerpts (Bastiaansen), Second Edition, Books4Brains, 2005, 178 pages.
PTAB-IPR2021-00674—Exhibit 1024—Rob's Guide—Amazon review (Jan. 4, 2007), printed on Mar. 22, 2021, in 5 pages.
PTAB-IPR2021-00674—('723) POPR Final, filed Jul. 8, 2021, in 70 pages.
PTAB-IPR2021-00674—Mar. 31, 2021 723 Petition, dated Mar. 31, 2021, in 87 pages.
PTAB-IPR2021-00674—Mar. 31, 2021 Explanation for Two Petitions, dated Mar. 31, 2021, in 9 pages.
PTAB-IPR2021-00674—Exhibit 1001—U.S. Pat. No. 9,740,723, Issue Date Aug. 22, 2017, in 51 pages.
PTAB-IPR2021-00674—Exhibit 1002—Jagadish Declaration, dated Mar. 31, 2021, in 200 pages.
PTAB-IPR2021-00674—Exhibit 1003—U.S. Pat. No. 9,740,723 file history, Issue Date Aug. 22, 2017, in 594 pages.
PTAB-IPR2021-00674—Exhibit 1004—Virtual Machine Monitors Current Technology and Future Trends, May 2005, in 9 pages.
PTAB-IPR2021-00674—Exhibit 1005—Virtualization Overview, Copyright Date 2005, in 11 pages.
PTAB-IPR2021-00674—Exhibit 1006—Let's Get Virtual_Final Stamped, dated May 14, 2007, in 42 pages.
PTAB-IPR2021-00674—Exhibit 1007—U.S. Pat. No. 8,458,419—Basler, Issue Date Jun. 4, 2013, in 14 pages.
PTAB-IPR2021-00674—Exhibit 1008—US20080244028A1 (Le), Issue Date Oct. 2, 2008, in 22 pages.
U.S. Appl. No. 60/920,847, filed Mar. 29, 2007 in 70 pages.
PTAB-IPR2021-00674—Exhibit 1010—Discovery Systems in Ubiquitous Computing (Edwards), Apr.-Jun. 2006, in 8 pages.
PTAB-IPR2021-00674—Exhibit 2001—esxRanger, 2006, in 102 pages.
PTAB-IPR2021-00674—Exhibit 2002—Want, 1995, in 31 pages.
PTAB-IPR2021-00674—Exhibit 2003—Shea, retrieved Jun. 10, 2021, in 5 pages.
PTAB-IPR2021-00674—Exhibit 1011—HTTP The Definitive Guide excerpts (Gourley), 2002, in 77 pages.
PTAB-IPR2021-00674—Exhibit 1012—VCB White Paper (Wayback Mar. 21, 2007), retrieved Mar. 21, 2007, Copyright Date 1998-2006, in 6 pages.
PTAB-IPR2021-00674—Exhibit 1013—Scripting VMware excerpts (Muller), 2006, in 66 pages.
PTAB-IPR2021-00674—Exhibit 1015—Carrier, 2005 in 94 pages.
PTAB-IPR2021-00674—Exhibit 1016—U.S. Pat. No. 7,716,171 (Kryger), Issue Date May 11, 2010, in 18 pages.
PTAB-IPR2021-00674—Exhibit 1017—RFC2609, Jun. 1999, in 33 pages.
PTAB-IPR2021-00674—Exhibit 1018—MS Dictionary excerpt, 2002, in 3 pages.
PTAB-IPR2021-00674—Exhibit 1019—*Commvault* v. *Rubrik* Complaint, Filed Apr. 21, 2020, in 29 pages.
PTAB-IPR2021-00674—Exhibit 1020—*Commvault* v. *Rubrik* Scheduling Order, Filed Feb. 17, 2021, in 15 pages.
PTAB-IPR2021-00674—Exhibit 1021—Duncan Affidavit, Dated Mar. 3, 2021, in 16 pages.
PTAB-IPR2021-00674—Exhibit 1022—Hall-Ellis Declaration, dated Mar. 30, 2021, in 291 pages.
PTAB-IPR2021-00674—Exhibit 1023—Digital_Data_Integrity_2007_Appendix_A_UMCP, 2007, in 24 pages.
PTAB-IPR2021-00674—Exhibit 2004—Jones Declaration, Dated Jul. 8, 2021, in 36 pages.
PTAB-IPR2021-00674—Exhibit 3001, dated Aug. 30, 2021, in 2 pages.
PTAB-IPR2021-00674—Exhibit IPR2021-00674 Joint Request to Seal Settlement Agreement, dated Aug. 31, 2021, in 4 pages.
PTAB-IPR2021-00674—Joint Motion to Terminate, Filed Aug. 31, 2021, in 7 pages.
PTAB-IPR2021-00674—Response to Notice Ranking Petitions Final, filed Jul. 8, 2021, in 7 pages.
PTAB-IPR2021-00674—Termination Order, filed Sep. 1, 2021, in 4 pages.
PTAB-IPR2021-00673—673 674 Termination Order, Sep. 1, 2021, in 4 pages.
PTAB-IPR2021-00673—Joint Motion to Terminate, filed Aug. 31, 2021, in 7 pages.
PTAB-IPR2021-00673—Joint Request to Seal Settlement Agreement, filed Aug. 31, 2021, in 4 pages.
PTAB-IPR2021-00673—('723) Sur-Reply Final, filed Aug. 16, 2021, in 7 pages.
PTAB-IPR2021-00673—723 patent IPR—Reply to POPR, filed Aug. 9, 2021, in 6 pages.
PTAB-IPR2021-00673—('723) POPR Final, filed Jun. 30, 2021, in 70 pages.
PTAB-IPR2021-00673—Exhibit 1001—U.S. Pat. No. 9,740,723, Issue Date Aug. 22, 2017, in 51 pages.
PTAB-IPR2021-00673—Exhibit 1003—FH 9740723, Issue Date Aug. 22, 2017, in 594 pages.
PTAB-IPR2021-00673—Exhibit 1006—U.S. Pat. No. 8,635,429—Naftel, Issue Date Jan. 21, 2014, in 12 pages.
PTAB-IPR2021-00673—Exhibit 1007—US20070288536A1—Sen, Issue Date Dec. 13, 2007, in 12 pages.
PTAB-IPR2021-00673—Exhibit 1008—US20060224846A1—Amarendran, Oct. 5, 2006, in 15 pages.
PTAB-IPR2021-00673—Exhibit 1009—U.S. Pat. No. 8,209,680—Le, Issue Date Jun. 26, 2012, in 55 pages.
PTAB-IPR2021-00673—Exhibit 1013—U.S. Pat. No. 8,135,930—Mattox, Issue Date Mar. 13, 2012, in 19 pages.
PTAB-IPR2021-00673—Exhibit 1014—U.S. Pat. No. 8,060,476—Afonso, Issue Date Nov. 15, 2011, in 46 pages.
PTAB-IPR2021-00673—Exhibit 1015—U.S. Pat. No. 7,823,145—Le 145, Issue Date Oct. 26, 2010, in 24 pages.
PTAB-IPR2021-00673—Exhibit 1016—US20080091655A1—Gokhale, Publication Date Apr. 17, 2008, in 14 pages.
PTAB-IPR2021-00673—Exhibit 1017—US20060259908A1—Bayer, Publication Date Nov. 16, 2006, in 8 pages.
PTAB-IPR2021-00673—Exhibit 1018—U.S. Pat. No. 8,037,016—Odulinski, Issue Date Oct. 11, 2011, in 20 pages.
PTAB-IPR2021-00673—Exhibit 1019—U.S. Pat. No. 7,925,850—Waldspurger, Issue Date Apr. 12, 2011, in 23 pages.
PTAB-IPR2021-00673—Exhibit 1020—U.S. Pat. No. 8,191,063—Shingai, May 29, 2012, in 18 pages.
PTAB-IPR2021-00673—Exhibit 1021—US8959509B1—Sobel, Issue Date Feb. 17, 2015, in 9 pages.
PTAB-IPR2021-00673—Exhibit 1022—U.S. Pat. No. 8,458,419—Basler, Issue Date Jun. 4, 2013, in 14 pages.
PTAB-IPR2021-00673—Exhibit 1059—US20060064555A1 (Prahlad 555), Publication Date Mar. 23, 2006, in 33 pages.
PTAB-IPR2021-00673—Exhibit 2001 Jones Declaration, filed Jun. 30, 2021, in 35 pages.
PTAB-IPR2021-00673—Exhibit 3001 RE_IPR2021-00535, 2021-00589, 2021-00590, 2021-00609, 2021-00673, 2021-00674, 2021-00675, Aug. 30, 2021, in 2 pages.
Vmware, Inc., Open Virtual Machine Format, <http://www.vmware.com/appliances/learn/ovf.html>internet accessed on May 6, 2008, 2 pages.

(56) References Cited

OTHER PUBLICATIONS

Case No. 1:20-cv-00524-MN, First Amended Answer DDE-1-20-cv-00524-96, filed Jul. 23, 2021, in 41 pages.
Case No. 1:20-cv-00524-MN, Stipulation DDE-1-20-cv-00524-93, filed Jul. 14, 2021, in 3 pages.
Case No. 1:20-cv-00524-MN, Oral Order DDE-1-20-cv-00524-86_DDE-1-20-cv-00525-87, filed Jun. 29, 2021, in 1 page.
Case No. 1:20-cv-00524-MN, Answer DDE-1-20-cv-00524-45, filed Feb. 16, 2021, in 25 pages.
Order DDE-1-20-cv-00525-38_DDE-1-20-cv-00524-42, filed Feb. 10, 2021, in 4 pages.
Case No. 1:20-cv-00524-MN, Amended Complaint DDE-1-20-CV-00524-13, filed Jul. 27, 2020, in 30 pages.
Case No. 1:20-cv-00524-MN, Complaint DDE-1-20-cv-00524-1, filed Apr. 21, 2020, in 29 pages.
Case No. No. 6:21-CV-00634-ADA, Answer WDTX-6-21-cv-00634-1 9, filed Aug. 27, 2021, in 23 pages.
Case No. 1:21-cv-00537, Complaint WDTX-1-21-cv-00537-1_WDTX-6-21-cv-00634-1, filed Jun. 18, 2021, in 44 pages.
Case No. 6:21-cv-00634-ADA, Order Dismissing with Prejudice WDTX-6-21-cv-00634-22, filed Sep. 1, 2021, in 1 page.
Case No. 1-20-CV-00525-38-MN, First Amended Answer DDE-1-20-cv-00525-95, filed Jul. 23, 2021, in 38 pages.
Case No. 1-20-CV-00525-38-MN, Oral Order DDE-1-20-cv-00524-86_DDE-1-20-cv-00525-87, filed Jun. 29, 2021, in 1 page.
Case No. 1-20-CV-00525-38-MN, Oral Order DDE-1-20-cv-00524-78_DDE-1-20-cv-00525-77, filed May 24, 2021, in 1 page.
Case No. 1-20-CV-00525-38-MN, Order DDE-1-20-cv-00525-38_DDE-1-20-cv-00524-42, filed Feb. 10, 2021, in 4 pages.
Case No. 1-20-CV-00525-38-MN, Amended Complaint DDE-1-20-CV-00525-15, filed Jul. 27, 2020, in 30 pages.
Case No. 1-20-CV-00525-38-MN, Complaint DDE-1-20-cv-00525-1, filed Apr. 21, 2020, in 28 pages.
Case No. 1:20-cv-00525-MN, Joint Claim Construction Brief Exhibits DDE-1-20-cv-00525-107-1, filed Oct. 1, 2021, in 488 pages.
Case No. No. 20-525-MN-CJB, Joint Claim Construction Brief DDE-1-20-cv-00525-107, filed Oct. 1, 2021, in 79 pages.
Case No. No. 20-525-MN-CJB, Joint Claim Construction Statement DDE-1-20-cv-00525-119, filed Oct. 29, 2021, in 12 pages.
Case No. No. 20-525-MN-CJB, Farnan Letter DDE-1-20-CV-00525-111, filed Oct. 6, 2021, in 2 pages.
Case No. No. 20-525-MN-CJB, Farnan Letter Exhibit A DDE-1-20-cv-00525-111-1, filed Oct. 6, 2021, in 7 pages.
Case No. 1:20-cv-00525-CFC-CJB, Joint Appendix of Exhibits 1-6, filed Jan. 13, 2022, in 2 pages.
Case No. 1:20-cv-00525-CFC-CJB, Joint Appendix of Exhibits 1-6, filed Jan. 13, 2022, in 224 pages.
Case No. 1:20-cv-00525-CFC-CJB, Joint Claim Construction Brief On Remaining Disputed Terms, filed Jan. 13, 2022, in 54 pages.
Case No. 120-CV-00525-MN—Stipulation of Dismissal, filed Jan. 27, 2022, in 2 pages.
PTAB-IPR2021-00609—('048) POPR Final, filed Jun. 16, 2021, in 28 pages.
PTAB-IPR2021-00609—Mar. 10, 2021 IPR Petition—pty, Mar. 10, 2021, in 89 pages.
PTAB-IPR2021-00609—Exhibit 1001—U.S. Appl. No. 10/210,048, Issue Date Feb. 19, 2019, in 49 pages.
PTAB-IPR2021-00609—Exhibit 1002—Sandeep Expert Declaration, dated Mar. 10, 2021, in 176 pages.
PTAB-IPR2021-00609—Exhibit 1003—U.S. Pat. No. 9,354,927 (Hiltgen), Issue Date May 31, 2016, in 35 pages.
PTAB-IPR2021-00609—Exhibit 1004—U.S. Pat. No. 8,677,085 (Vaghani), Issue Date Mar. 18, 2014, in 44 pages.
PTAB-IPR2021-00609—Exhibit 1005—U.S. Pat. No. 9,639,428 (Boda), Issue Date May 2, 2017, in 12 pages.
PTAB-IPR2021-00609—Exhibit 1006—US20150212895A1 (Pawar), Publication Date Jul. 30, 2015, in 60 pages.
PTAB-IPR2021-00609—Exhibit 1007—U.S. Pat. No. 9,665,386 (Bayapuneni), Issue Date May 30, 2017, in 18 pages.
PTAB-IPR2021-00609—Exhibit 1008—Popek and Golberg, Jul. 1974, in 10 pages.
PTAB-IPR2021-00609—Exhibit 1009—Virtualization Essentials—First Edition (2012)—Excerpted, 2012, in 106 pages.
PTAB-IPR2021-00609—Exhibit 1010—Virtual Machine Monitors Current Technology and Future Trends, May 2005, in 9 pages.
PTAB-IPR2021-00609—Exhibit 1011—Virtualization Overview, 2005, in 11 pages.
PTAB-IPR2021-00609—Exhibit 1012—Let's Get Virtual A Look at Today's Virtual Server, May 14, 2007, in 42 pages.
PTAB-IPR2021-00609—Exhibit 1013—Virtual Volumes, Jul. 22, 2016, in 2 pages.
PTAB-IPR2021-00609—Exhibit 1014—Virtual Volumes and the SDDC—Virtual Blocks, Internet Archives on Sep. 29, 2015, in 4 pages.
PTAB-IPR2021-00609—Exhibit 1015—NEC White Paper—VMWare vSphere Virtual Volumes (2015), Internet Archives Dec. 4, 2015 in 13 pages.
PTAB-IPR2021-00609—Exhibit 1016—EMC Storage and Virtual Volumes, Sep. 16, 2015 in 5 pages.
PTAB-IPR2021-00609—Exhibit 1017—U.S. Pat. No. 8,621,460 (Evans), Issue Date Dec. 31, 2013, in 39 pages.
PTAB-IPR2021-00609—Exhibit 1018—U.S. Pat. No. 7,725,671 (Prahlad), Issue Date May 25, 2010, in 48 pages.
PTAB-IPR2021-00609—Exhibit 1019—Assignment—Vaghani to VMWare, Feb. 8, 2012, in 8 pages.
PTAB-IPR2021-00609—Exhibit 1020—Assignment Docket—Vaghani, Nov. 11, 2011, in 1 page.
PTAB-IPR2021-00609—Exhibit 1021—Dive into the VMware ESX Server hypervisor—IBM Developer, Sep. 23, 2011, in 8 pages.
PTAB-IPR2021-00609—Exhibit 1022—MS Computer Dictionary Backup labeled, 2002 in 4 pages.
PTAB-IPR2021-00609—Exhibit 1023—Jul. 7, 2014_VMware vSphere Blog, Jun. 30, 2014, 4 pages.
PTAB-IPR2021-00609—Exhibit 1024—*CommVault* v. *Rubrik* Complaint, filed on Apr. 21, 2020, in 29 pages.
PTAB-IPR2021-00609—Exhibit 1025—*CommVault* v. *Cohesity* Complaint, filed on Apr. 21, 2020, in 28 pages.
PTAB-IPR2021-00609—Exhibit 1026—Feb. 17, 2021 (0046) Scheduling Order, filed on Feb. 17, 2021, in 15 pages.
PTAB-IPR2021-00609—Exhibit 2001—Prosecution History_Part1, Issue Date Feb. 19, 2019, in 300 pages, Part 1 of 2.
PTAB-IPR2021-00609—Exhibit 2001—Prosecution History_Part2, Issue Date Feb. 19, 2019, in 265 pages, Part 2 of 2.
PTAB-IPR2021-00609—Exhibit 2002—Jones Declaration, dated Jun. 16, 2021, in 38 pages.
PTAB-IPR2021-00609—Exhibit 3001—Re_ IPR2021-00535, 2021-00589, 2021-00590, 2021-00609, 2021-00673, 2021-00674, 2021-00675, dated Aug. 30, 2021, in 2 pages.
PTAB-IPR2021-00609—Joint Motion to Terminate. Filed Aug. 31, 2021, in 7 pages.
PTAB-IPR2021-00609—Joint Request to Seal Settlement Agreement, filed Aug. 31, 2021, in 4 pages.
PTAB-IPR2021-00609—Termination Order, Sep. 1, 2021, in 4 pages.
PTAB-IPR2021-00673—Patnet Owner Mandatory Notice, filed Apr. 7, 2021, 6 pages.
Case No. 1:20-cv-00524-MN, Order Dismissing with Prejudice All Claims, DDE-1-20-cv-00524-101, filed Jul. 26, 2021, in 1 page.

SYSTEMS AND METHODS TO IDENTIFY UNPROTECTED VIRTUAL MACHINES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

Increasingly, companies are turning to virtualized computing devices to store, manipulate, and display the information that is constantly subject to change. The term virtualization in the computing arts can refer to the creation of a virtual instance of an entity (e.g., a hardware platform, operating system, storage device or network resource, etc.) that behaves like a physical instance. For instance, a virtual machine can be a software representation of a physical machine. Companies currently use virtualization for a variety of purposes, such as to reduce the number of physical servers or other computers by instantiating multiple virtual machines on a single physical host computer. In this manner, virtualization can be used to centralize administrative tasks while improving scalability and work loads, and can be an important tool for maximizing hardware utilization.

As such, enterprises are generating and backing up or otherwise protecting increasing volumes of data, presenting significant data management challenges.

SUMMARY

The benefits of server virtualization are compelling and are driving the transition to large scale virtual server deployments. From the cost savings recognized through server consolidation or business flexibility and agility inherent in cloud architectures, virtualization technologies are being rapidly deployed.

However, virtual server deployment is having unintended consequences for data protection. Virtual machines are easy to create. They can pop up over night with no warning and little communication with network administrators. Network administrators should know how many virtual machines are running on their network, which physical machines are hosting them, where their storage is located, what software is associated with them, why they were originally created, and who created them. But often they do not. This leads to virtual machines with no designated periodic backup or, in other words, unprotected virtual machines. If the data associated with these unprotected virtual machines is not backed up, it cannot be restored if needed, leading to system failures.

Virtual machines have the same support, security, and compliance issues as physical machines. Traditional backup tools require manual intervention to configure a backup schedule and policy for each newly created virtual machine. Not only is this process time consuming in terms of manual configuration, but also requires time to determine where each virtual machine came from, and then determine to most appropriate backup schedule to apply to each virtual machine. Virtualization sprawl occurs when the number of virtual machines on a network reaches a point where the administrator can no longer manage them effectively.

Due to the above challenges, it can be important to provide efficient, user-friendly tools for facilitating effective backup policies and for providing access to backup data. Systems and methods are provided herein to automatically discover and protect unprotected virtual machines.

Certain embodiments relate to a method to identify virtual machine backup policies in a data management system. The method comprises automatically requesting with one or more computer processors a first list of virtual machines in a data management system from virtual machine management software, receiving the first list of the virtual machines in the data management system in response to the request, automatically retrieving with one or more computer processors a second list of virtual machines in the data management system from a storage manager associated with the data management system, each virtual machine on the second list associated with a backup policy, automatically comparing with one or more computer processors the first list with the second list, and automatically identifying with one or more computer processors the virtual machines not associated with a backup policy based at least in part on the comparison.

According to certain embodiments, a system to identify virtual machine backup policies in an information management cell is disclosed. The system comprises computer hardware including one or more computer processors, and computer-readable storage comprising computer-readable instructions that, when executed by the one or more processors, cause the computer hardware to perform operations defined by the computer-readable instructions. The computer-readable instructions are configured to automatically request a first list of virtual machines in an information management cell from virtual machine management software, receive the first list of virtual machines in the information management cell in response to the request, automatically retrieve a second list of virtual machines in the information management cell from a storage manager associated with the information management cell, each virtual machine on the second list associated with a backup policy, automatically compare the first list with the second list, and automatically identify the virtual machines not associated with a backup policy based at least in part on the comparison.

DETAILED DESCRIPTION

Information Management System Overview

Systems and methods are described herein to automatically discover and protect unprotected virtual machines. Further examples of systems and methods for 1) identifying virtual machine backup policies; 2) automatically categorizing unprotected virtual machines; 3) identifying uncategorized virtual machines as unprotected; and 4) protecting unprotected virtual machines are described below with respect to FIGS. 2-7.

Moreover, it will be appreciated that data generated by information management systems such as those that will now be described with respect to FIGS. 1A-1E can be protected as well. And, as will be described, the componentry for implementing secondary data operations can be incorporated into such systems.

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
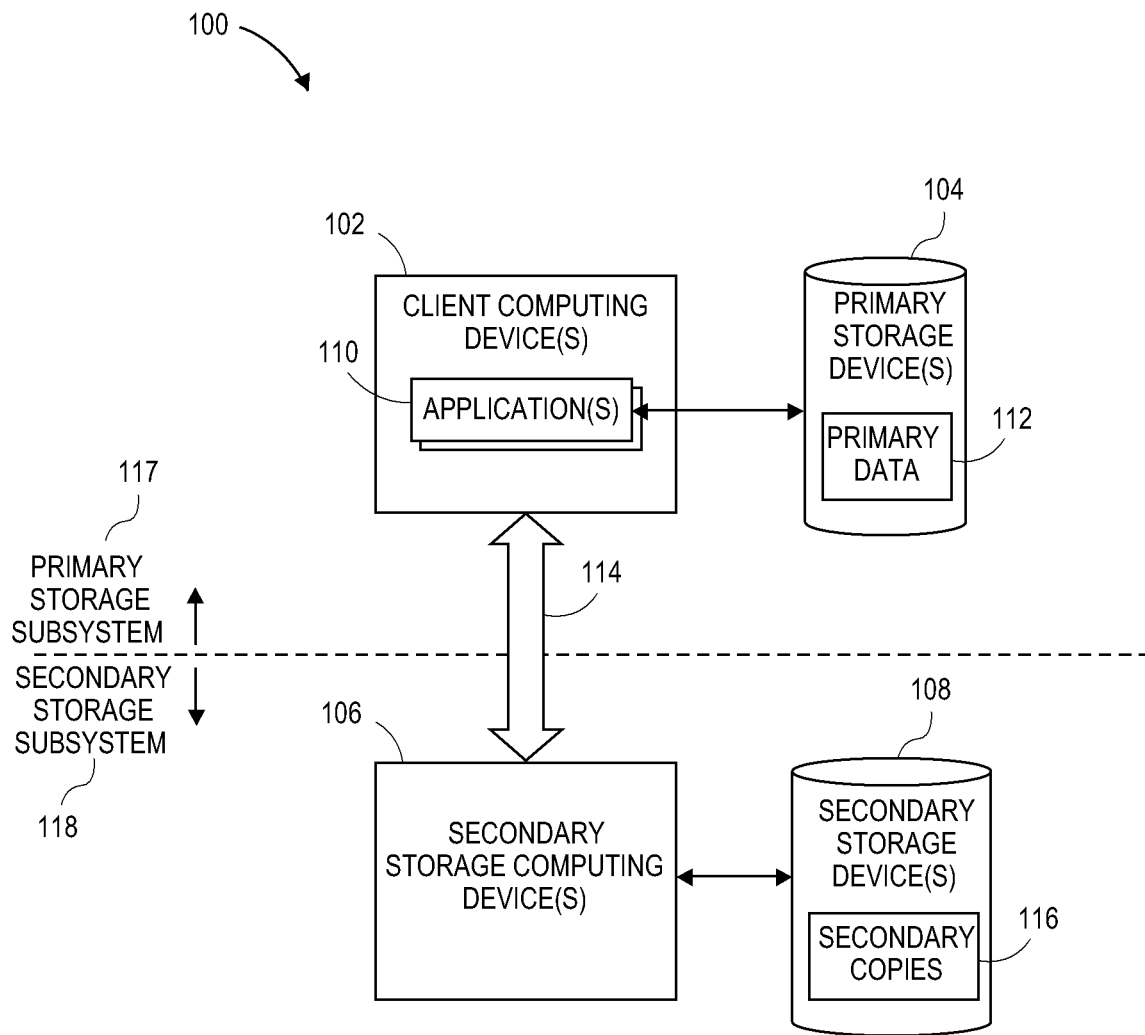
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010/0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. Pub. No. 2012/0084268, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as or information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
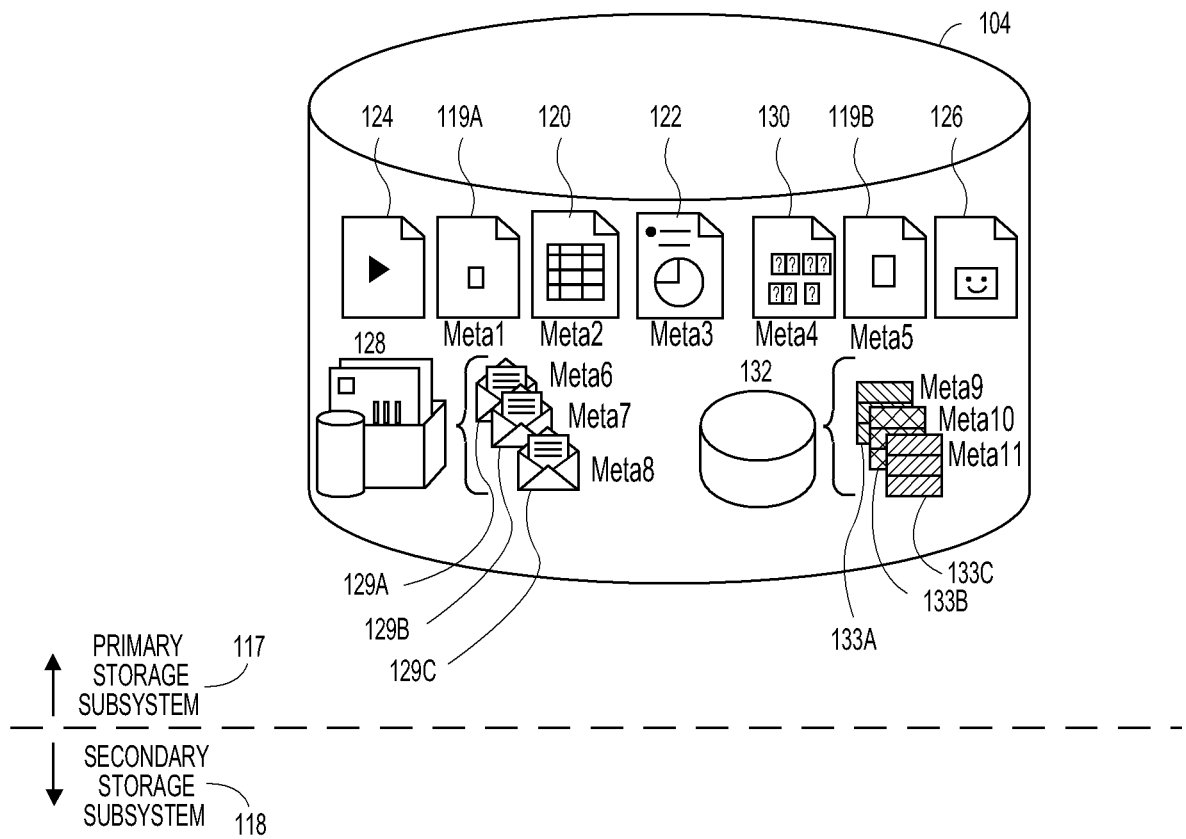
FIG. 1B is a detailed view of a primary storage device, a secondary storage device, and some examples of primary data and secondary copy data.
Figure 1B:
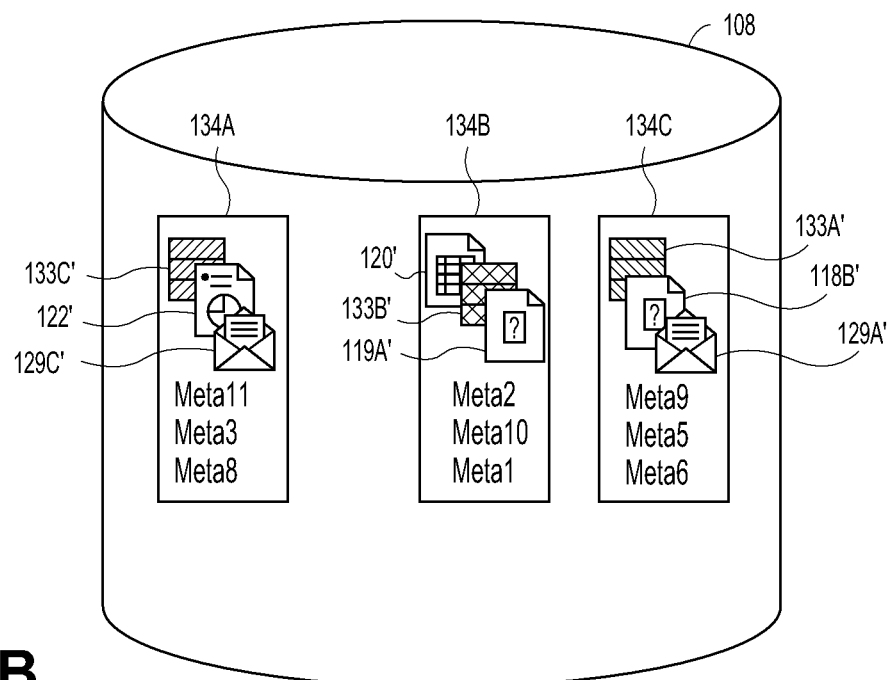

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
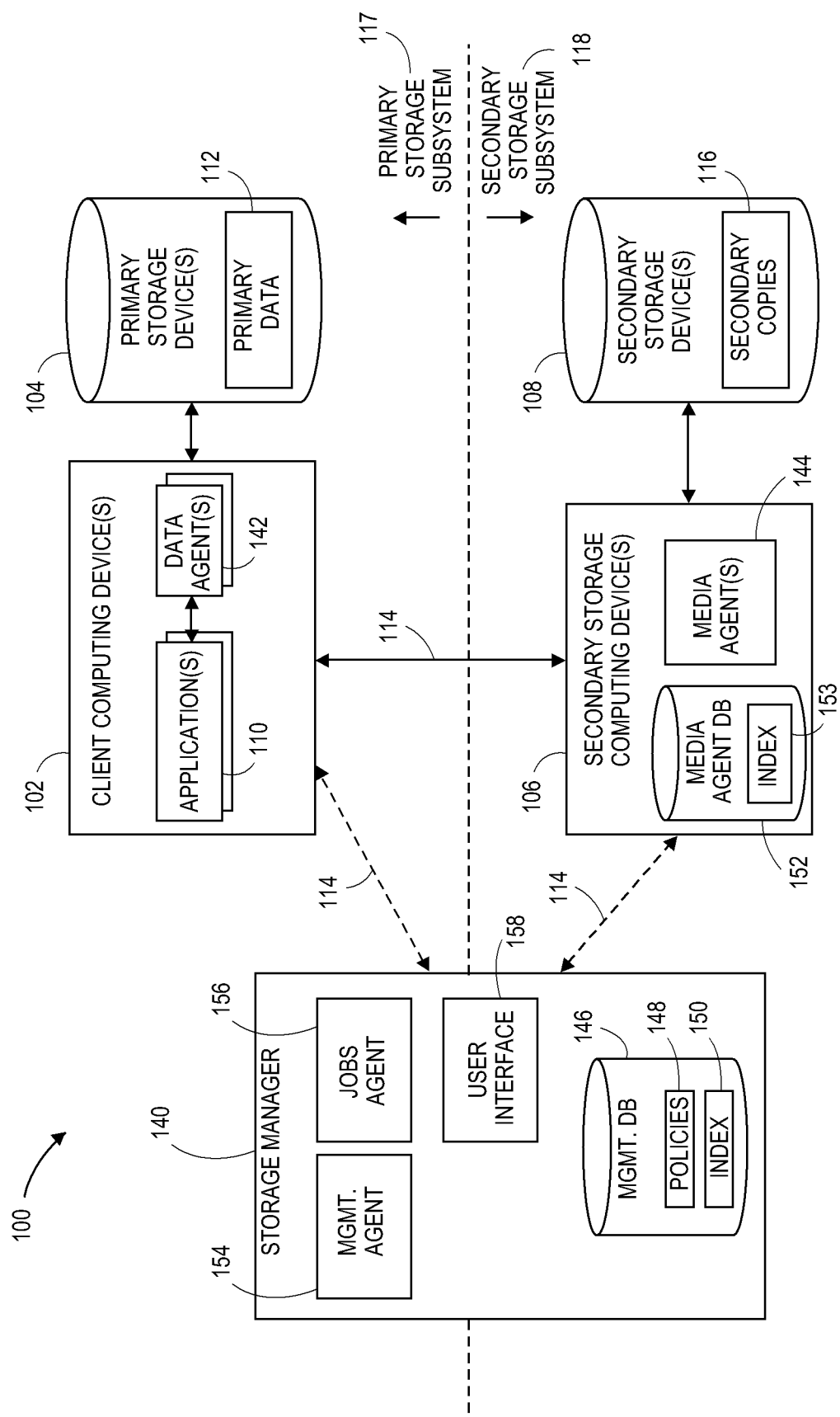
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
  initiating execution of secondary copy operations;
  managing secondary storage devices 108 and inventory/capacity of the same;
  allocating secondary storage devices 108 for secondary storage operations;
  monitoring completion of and providing status reporting related to secondary storage operations;

tracking age information relating to secondary copies 116, secondary storage devices 108, and comparing the age information against retention guidelines;

tracking movement of data within the information management system 100;

tracking logical associations between components in the information management system 100;

protecting metadata associated with the information management system 100; and implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 by even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
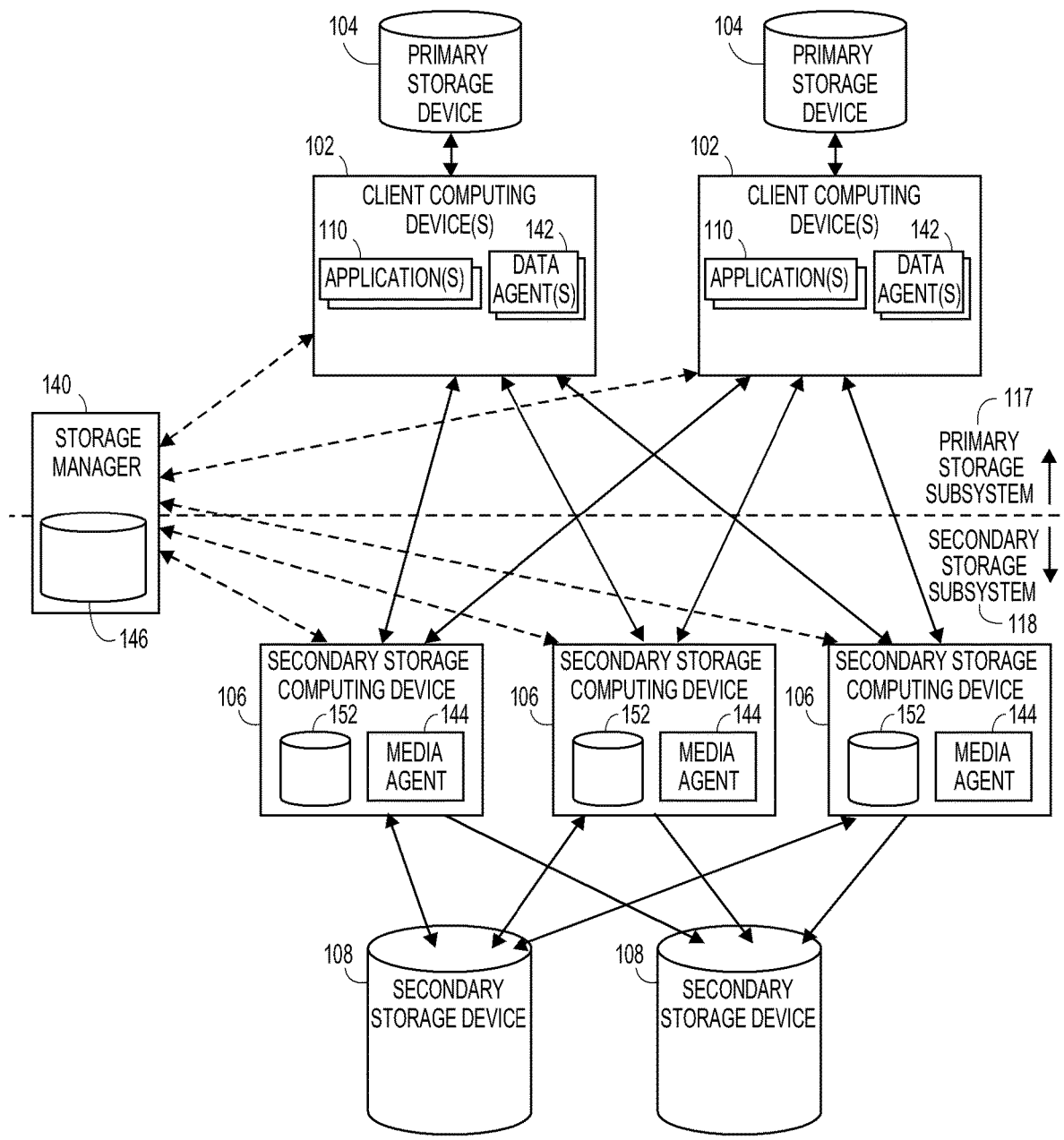
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084268, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
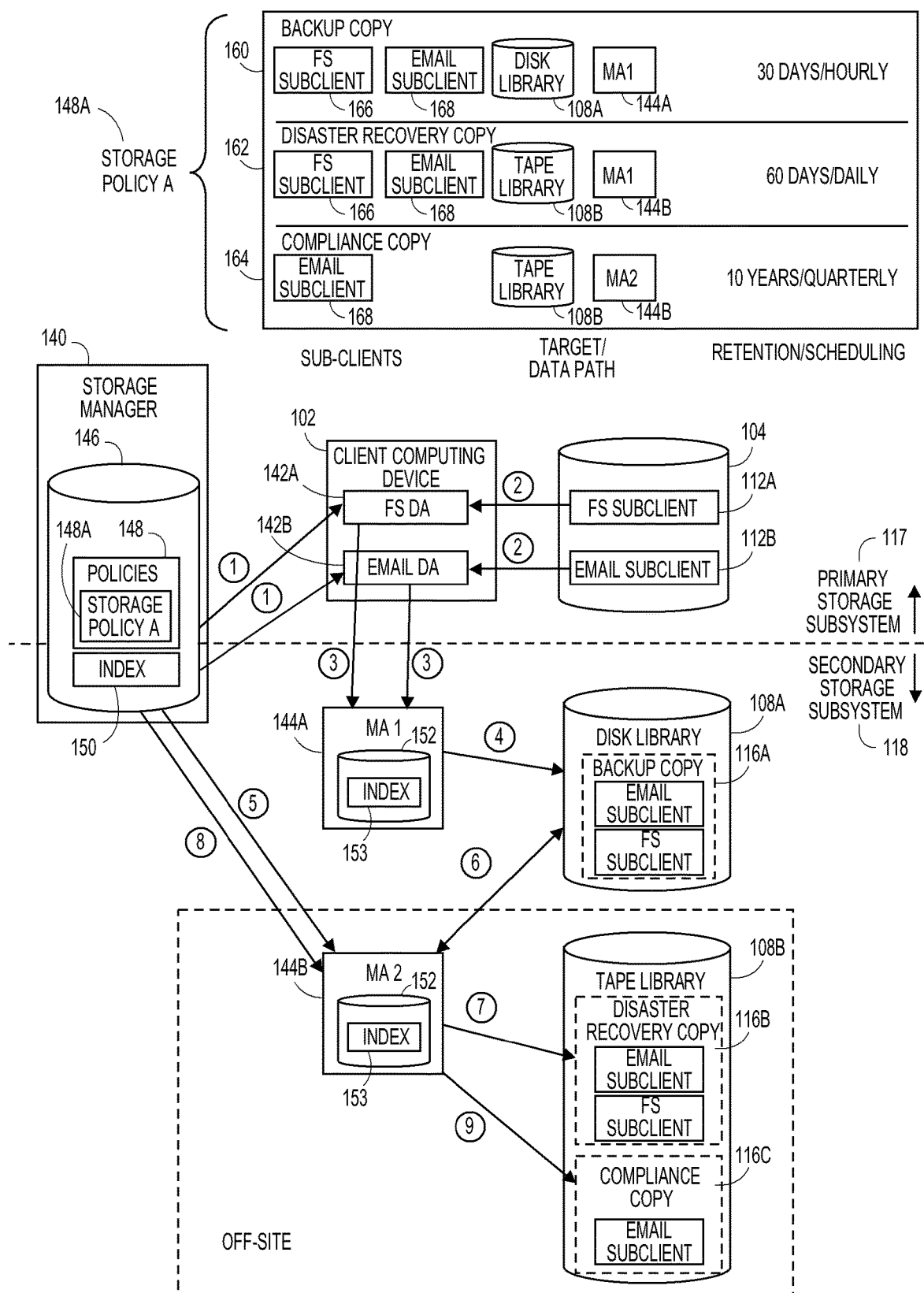
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers 300 can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

System Overview

The systems and methods described with respect to FIGS. 1A-1E can be used for protecting secondary copy data. For instance, the system of FIG. 1D applies backup policies and backs up the data from client computing devices 102 in the data storage system. In other embodiments, data storage systems include virtual computing devices. As indicated above, when virtual machines are created, network administrators will sometimes fail to set the protection schemes to ensure that the virtual machines will be backed up. Systems and methods are described herein to automatically discover and protect unprotected virtual machines. Further examples of systems and methods for 1) identifying virtual machine backup policies; 2) automatically categorizing unprotected virtual machines; 3) identifying uncategorized virtual machines as unprotected; and 4) protecting unprotected virtual machines are described below with respect to FIGS. 2-7.

Auto Discovery

Figure 2:
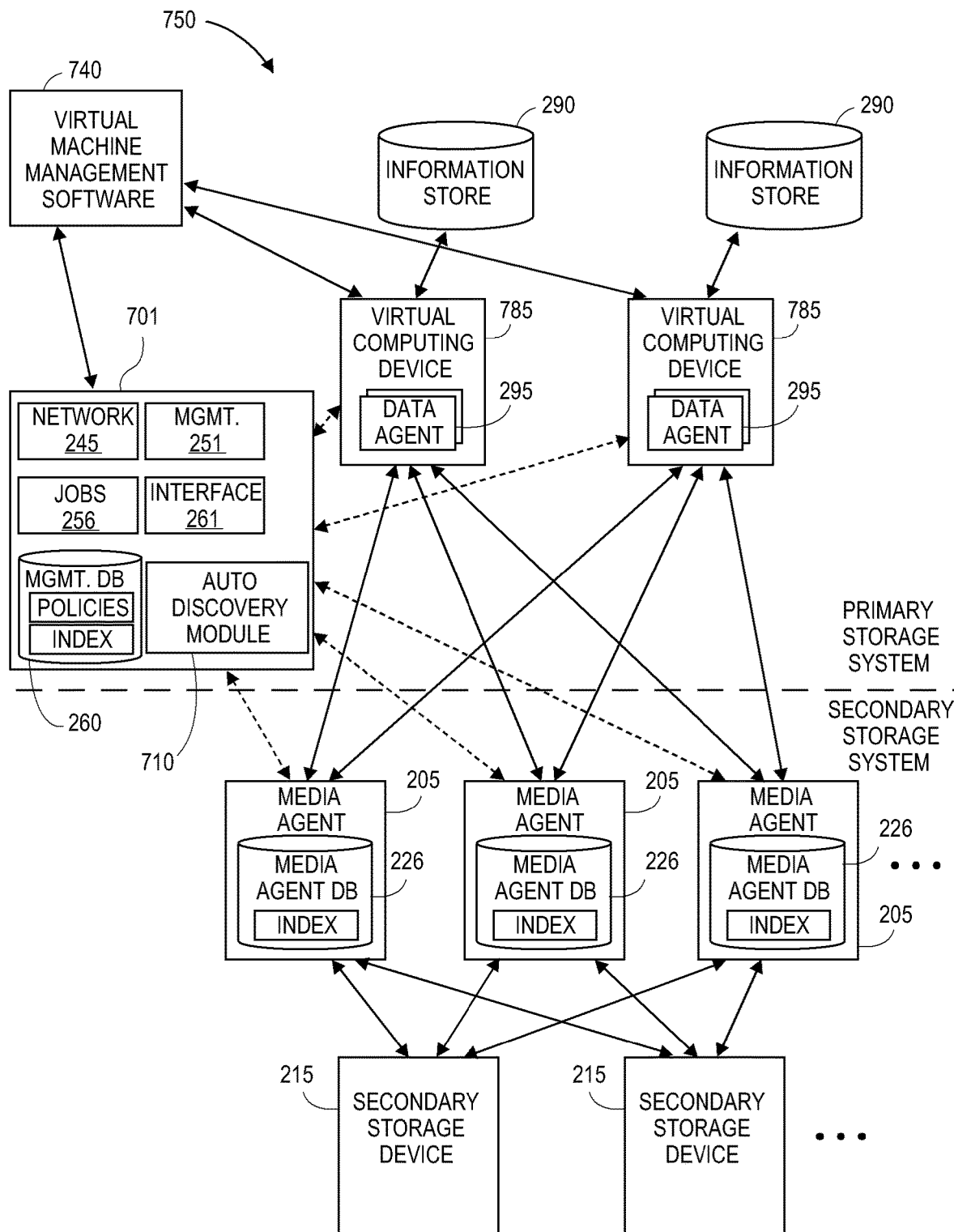
FIG. 2 is a block diagram illustrating another exemplary information management cell.

FIG. 2 is a block diagram illustrating an arrangement of resources that form an example information management cell 750. According to certain embodiments, some or all of the components of the information management cell 750 of FIG. 2 may have the same or similar structure and/or functionality as the similarly named components of the information management cell of FIG. 1D As shown, the information management cell 750 can include virtual machine management software 740, a storage or information manager 701, one or more virtual machines 785, one or more primary data storage mediums 290, one or more media agents 205, and one or more secondary storage mediums 215.

The virtual machine management software 740, in an embodiment, configures, provisions, and manages virtualized environments, and stores information about the physical servers, resource pools and virtual machines. Examples of virtual machine management software 740 are VMware® VirtualCenter, Microsoft® System Center Virtual Machine Manager, and the like. The virtual machine management software 740 interfaces with the virtual machines 785 to retrieve information about the virtual machine 785, which is stored in a database associated with the virtual machine management software 740. Examples of the stored information are the number of virtual machines in the information management cell 750, the physical server associated with each virtual machine 785, and the like.

The storage or information manager 701 may be a software module or other application that coordinates and/or controls storage operations performed by one or more information management cells 750, similar to that described above for the storage or information manager 140 and the information management cell 100 of FIGS. 1C and 1D. In this manner, the storage or information manager 701 may act as a generally central control component with respect to the other components in the cell 750. As shown by the dashed lines, the storage or information manager 701 may communicate with and/or control some or all elements of the information management cell 750, such as the media agents 205 and virtual computing devices 785, to initiate, coordinate, and/or manage secondary copy operations.

The storage or information manager 701 comprises an auto discovery module 710 which, when executed, interfaces with the virtual machine management software 740 to retrieve information about the virtual machines 785 in the information management cell 750. Moreover, as will be described below, the auto discovery module 710, when executed, can also identify virtual machine backup policies, and automatically categorize virtual machines without designated backup policies, identify uncategorized virtual machines as unprotected, and implement a default backup policy for these unprotected virtual machines.

While the auto discovery module is shown as residing on the storage manager 701, in some embodiments auto discovery functionality is advantageously distributed amongst other components in the system. For instance, depending on the embodiment, auto discovery agents can execute on or form a part of one or more of the clients 785, one or more of the data agents 295, or one or more of the media agents 205.

As described above with respect to storage or information manager 140 of FIG. 1D, the storage or information manager 701 may maintain the database 260 of management-related data and policies. As shown, the database 260 may include a management index or other data structure that stores logical associations between components of the system, user preferences and/or profiles, such as preferences regarding the scheduling, type, or other aspects of secondary copy operations, management tasks, media containerization, or other useful data.

The storage manager database 260 may maintain various "information management policies," and associated data, which in some embodiments are stored in the management database 260 of the storage manager 701, although the policies can be stored in any appropriate location. A storage or other information management policy may be stored in the media agent database 226 or in secondary storage media 215 (e.g., as an archive copy) as metadata for use in information management operations, depending on the embodiment.

Generally, a policy can include a data structure or other information source that specifies a set of parameters (e.g., criteria and rules) associated with performing one or more information management operations. For example, a policy can contain information sufficient for the information management system 750 to set up and execute information management operations corresponding to the policy.

According to some embodiments, a policy comprises a data structure that defines at least timing information and type(s) sufficient for the system to perform corresponding information management operations, such as secondary copy operations (e.g. data backup operations). Timing information can including scheduling information, and may specify when (e.g., under what triggering conditions) and/or with what frequency (e.g., hourly, weekly, daily, event-based, etc.) operations will take place.

Specifically with respect to secondary copy operations, in some embodiments a policy can be a data structure that defines at least timing information, the type(s) of secondary copy, and information sufficient to determine a secondary storage destination (e.g., a location or class or quality of storage media) for storing the secondary copy. A storage policy may include a schedule policy specifying when and how often to perform secondary storage operations.

Policies can additionally specify a variety of historical or current criteria that may be used to determine which rules to apply to a particular data object, system component, or information management operation. In an embodiment, the policies can specify criteria that may be used to determine which backup rules apply to virtual machines that do not have a designated backup policy. These criteria or auto-discovery rules can be used to ensure that virtual machines are protected automatically without manual intervention.

The virtual machine 785 is a software implementation of a computing environment in which an operating system or program can be installed and run. The virtual machine 785 typically emulates a physical computing environment, but requests for CPU, memory, hard disk, network and other hardware resources are managed by a virtualization layer which translates these requests to the underlying physical hardware.

The virtual machines 785 are created within the virtualization layer, such as a hypervisor or a virtualization platform that runs on top of a client or server operating system. This operating system is often known as the host operating system. The virtualization layer can be used to create many individual, isolated virtual machine environments.

Typically, guest operating systems and programs are not aware that they are running on a virtual platform and, as long as the virtual machine's virtual platform is supported, this software can be installed in the same way it would be deployed to physical server hardware. For example, the guest operating system might appear to have a physical hard disk attached to it, but actual I/O requests are translated by the virtualization layer so they actually occur against a file that is accessible by the host operating system.

As indicated above, the virtual machines 785 interface with and provide information to the virtual machine management software 740. In another embodiment, the virtual machine 785 interfaces with the storage or information manager 701. By executing the auto discovery module 710, the information or storage manager 701 queries each computing device 102, 785 to confirm whether the device 102, 785 is a virtual machine and to determine whether the confirmed virtual machines 785 are associated with a backup policy. Each virtual machine 785 provides information, such as its existence in the information management cell 750, its associated physical server, its associated backup policy or lack of backup policy, and the like, to the storage or information manager 701. In an embodiment, the information is stored in the management database 260 for access by the storage or information manager 701.

With further reference to FIG. 2, the interaction between the various components of the example data storage system will now be described in greater detail.

Figure 3:
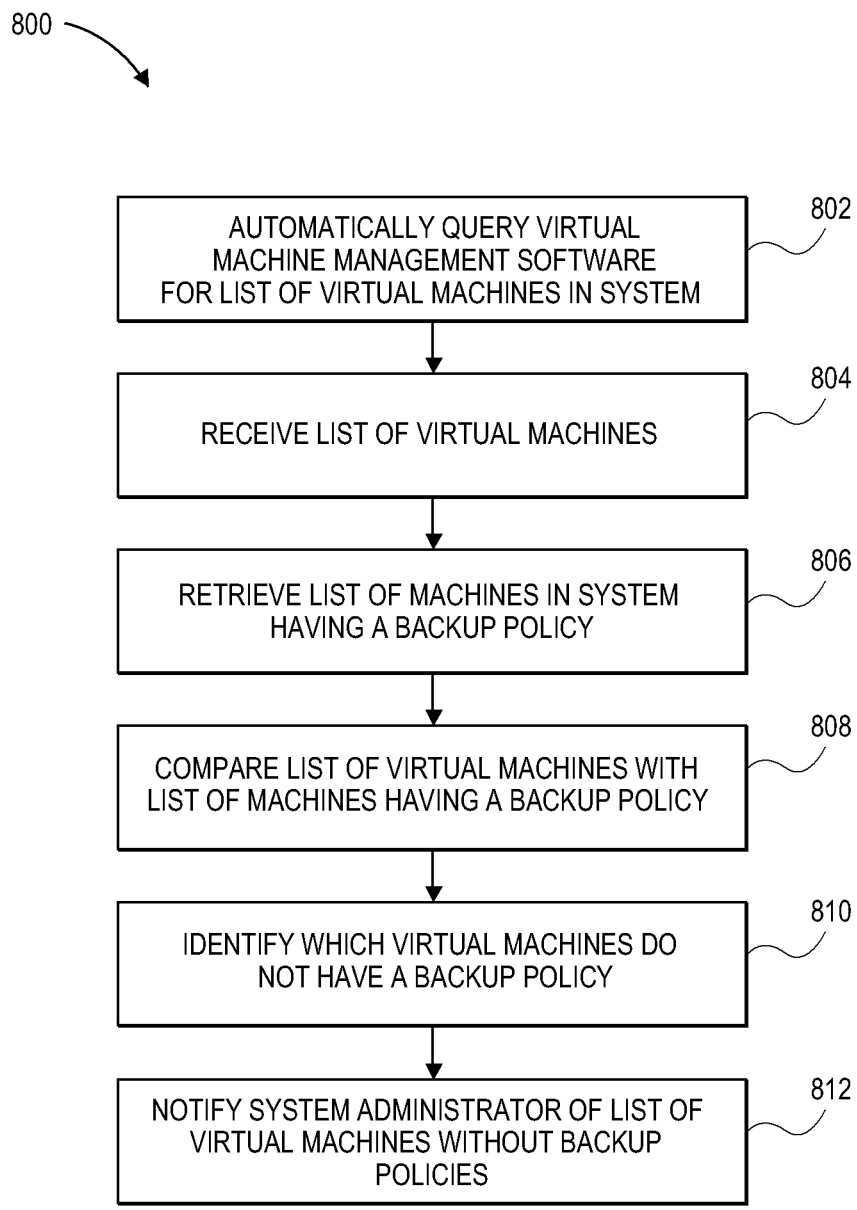
FIG. 3 illustrates a flow chart of an exemplary embodiment of a process to identify virtual machine backup policies usable by the system of FIG. 2.

FIG. 3 illustrates a flow chart of an exemplary embodiment of a process 800 to identify virtual machine backup policies usable by the information management system 750. At block 802, the information or storage manager 701 queries the virtual machine management software 740 for a list of virtual machines 785 in the information management system 750.

At block 804, the information or storage manager 701 receives a list of the virtual machines 785 in the information management system 750 from the virtual machine management software 740.

At block 806, the process 800 retrieves a list of machines (virtual machines 785 and client computing devices 102) in the information management system 750 that have designated backup policies. In an embodiment, the list of virtual machines 785 and client computing devices 102 is stored in the management database 260.

At block 808, the process 800 compares the list of virtual machines 785 in the information management system 750 with the list of machines in the information management system 750 having designated backup policies.

At block 810, the process 800 identifies which virtual machines 785 in the information management system 750 do not have a backup policy. The virtual machines 785 without an associated backup policy are unprotected. In an embodiment, an indication of the virtual machines 785 without designated backup policies is stored in the management database 260.

At block 812, the process 800 notifies the system or network administrator of the virtual machines 785 without an associated backup policy or the unprotected virtual machines 785. In an embodiment, the process 800 notifies the administrator through a graphical user interface.

Figure 4:
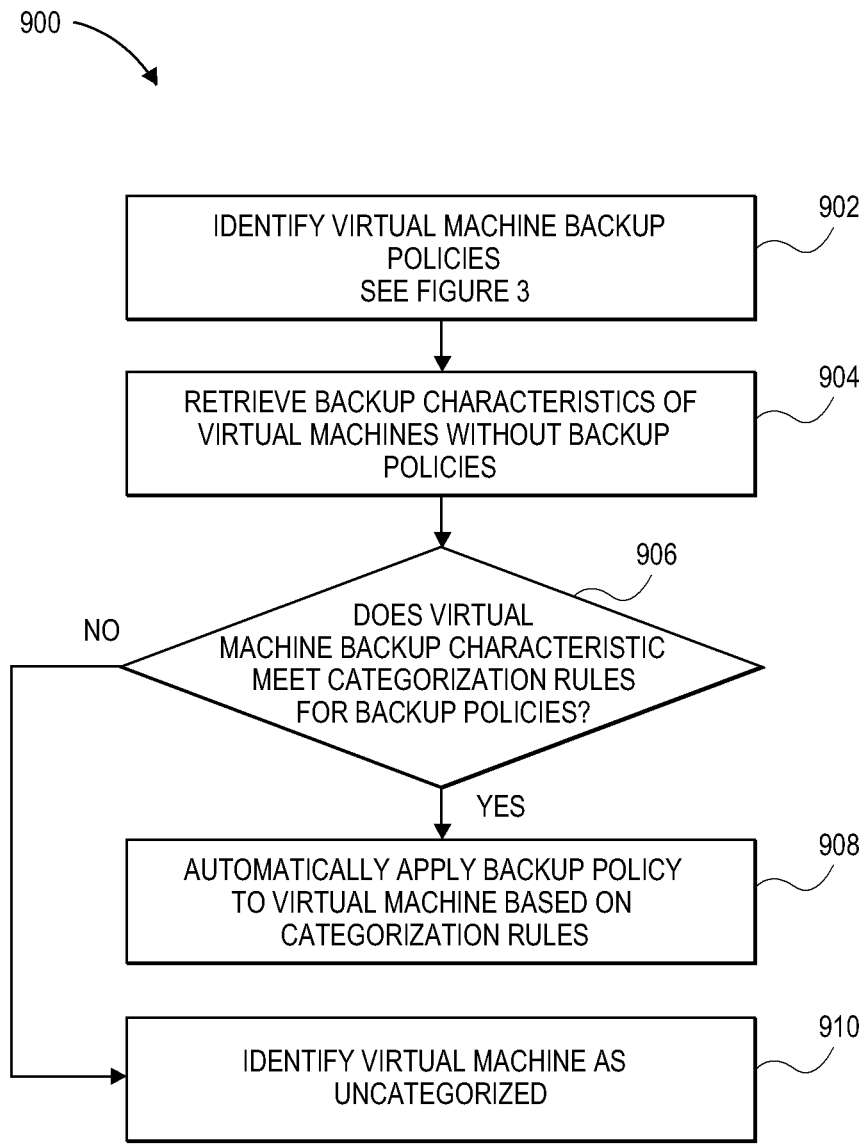
FIG. 4 illustrates a flow chart of an exemplary embodiment of a process to automatically categorize unprotected virtual machines usable by the system of FIG. 2.

FIG. 4 illustrates a flow chart of an exemplary embodiment of a process 900 to automatically categorize unprotected virtual machines usable by the information management system 750.

At block 902, the process 900 identifies the virtual machine backup policies of the virtual machines 785 in the information management system 750. In an embodiment, the process 900 identifies which virtual machines 785 in the information management system 750 are not assigned a backup policy by comparing the list of virtual machines in the system 750 with the list of machines in the system 750 having designated backup policies, as is described above with respect to FIG. 3.

At block 904, the process 900 automatically retrieves backup characteristics associated with the virtual machines 785 not assigned backup policies. In an embodiment, the backup characteristics are stored in the management database 260. In another embodiment, the information or storage manager 701 queries each virtual machine 785 not assigned a backup policy and receives backup characteristics from the queried virtual machines 785. In a further embodiment, the process 900 retrieves the backup characteristics associated with the virtual machines 785 not assigned a backup policy from the virtual machine management software 740. Examples of backup characteristics are the type of client, processor platform, operating system, type and version of software being run, the user, the location of the user, the department to which the virtual machine 785 is assigned, name of the virtual machine 785, guest DNS hostname, guest operating system, location in the virtual machine management software 740 of one or more of a folder, resource pool, datacenter, and vApp, location of the virtual machine datastore 290, attributes in the virtual machine management software 740, state of the virtual machine 785, such as power on, and the like.

At block 906, the process 900 automatically determines whether the virtual machine's backup characteristics meet the criteria for pre-defined categories or auto-discovery rules associated with backup policies. Each category is associated with criteria and a backup policy. In an embodiment, the process 900 automatically compares the backup characteristics associated with the virtual server 785 to the criteria associated with the categories of auto-discovery rules.

In an embodiment, backup policies are fine tuned to apply the timing, frequency, storage location, and the like, appropriate to the client device being backed up. For example, client devices associated with an accounting department may be backed up every 2 hours, while client devices associated with an engineering department may be backed up every week.

Figure 5:
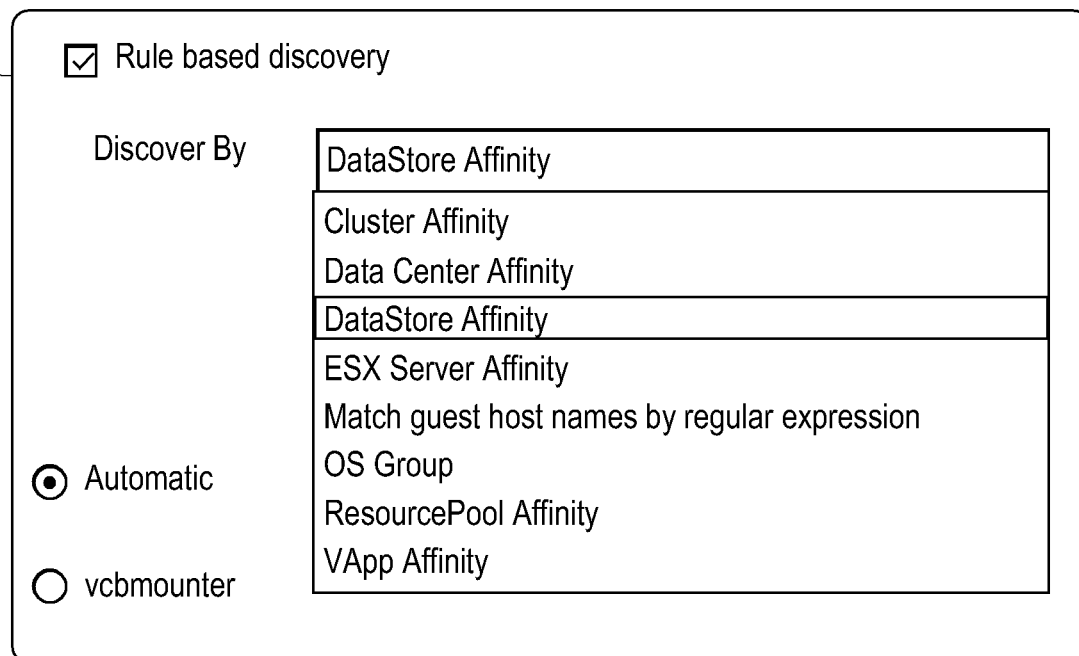
FIG. 5 is an exemplary screen shot of available auto-discovery rules usable by the system of FIG. 2.

FIG. 5 is an exemplary screen shot 1000 of available auto-discovery rules usable by the information management system 750. Exemplary screen shot 1000 shows auto-discovery rules in the following categories: cluster affinity, data center affinity, data store affinity, ESX server affinity, matching guest host names by regular expression, operating system group, resource pool affinity, and virtual application affinity. In other embodiments, the categories of auto-discovery rules may be different from the exemplary categories of FIG. 5.

As described above, each category is associated with criteria and a backup policy. For example, the criteria for the cluster affinity category may be any client device connected to the administration department cluster and the backup policy associated with the cluster affinity category may be a backup schedule of once a day at 11 p.m.

Referring to block 906 of FIG. 4, when the backup characteristics of the virtual machine 785 meet the criteria associated with a particular auto-discovery rule, the process 900 moves to block 908. At block 908, the process 900 automatically applies the backup policy associated with the auto-discovery rules to the virtual device 785. Thus, the virtual device 785 is automatically protected by the process 900. In an embodiment, the process 900 associates the backup policy with the virtual device 785 and stores the association in the management database 260.

Referring to block 906, when the backup characteristics of the virtual machine 785 do not fit the criteria associated with any of the auto-discovery rules, the process 900 moves to block 910. At block 910, the process 900 identifies the virtual machine 785 as uncategorized. The virtual machine 785 is uncategorized when it does not have a designated backup policy and it cannot be automatically assigned a backup policy associated with the auto-discovery rules because it does not fit into any of the categories of auto-discovery rules.

Figure 6:
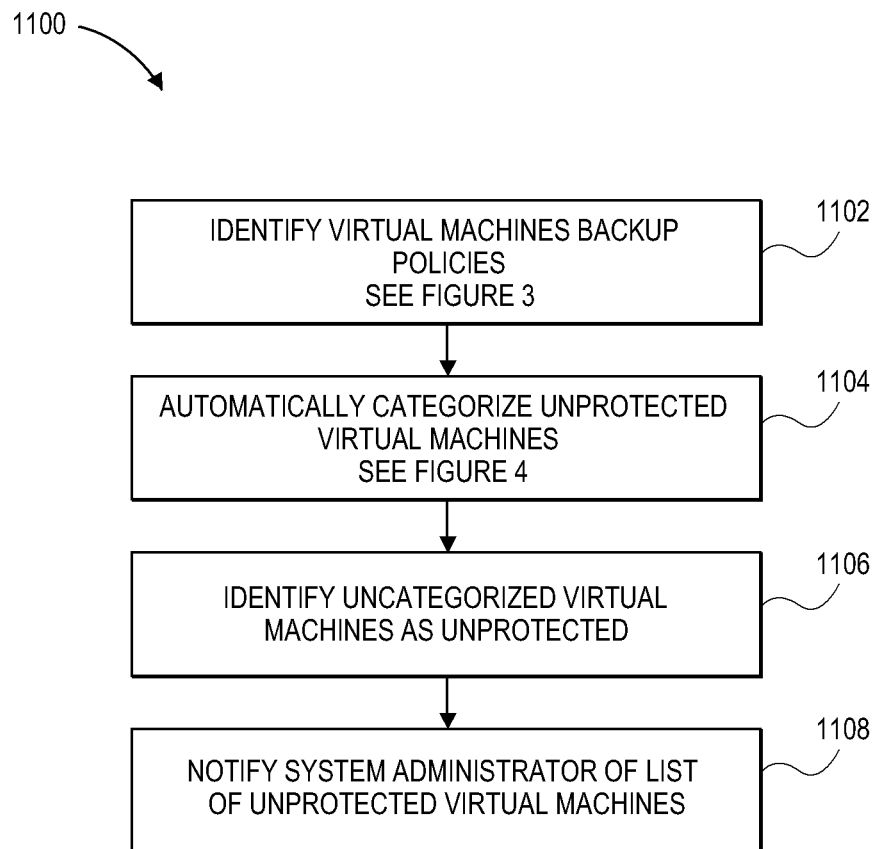
FIG. 6 illustrates a flow chart of an exemplary embodiment of a process to identify an unprotected category of virtual machines usable by the system of FIG. 2.

FIG. 6 illustrates a flow chart of an exemplary embodiment of a process 1100 to identify an unprotected category of virtual machines 785 usable by the information management system 750.

At block 1102, the process 1100 identifies the virtual machine backup policies of the virtual machines 785 in the information management system 750. In an embodiment, the process 1100 identifies which virtual machines 785 in the information management system 750 are not assigned a backup policy by comparing the list of virtual machines in the system 750 with the list of machines in the system 750 having designated backup policies, as described above with respect to FIG. 3.

At block 1104, the process 1100 automatically categorizes virtual machines 785 not associated with a backup policy. In an embodiment, the process 1100 automatically compares the backup characteristics of the virtual machines 785 without designated backup policies to the criteria associated with categories of auto-discovery rules such that when there is a match, the virtual machine is assigned the backup policy associated with the matching category and when there is no match, the virtual machine 785 is identified as uncategorized, as described above with respect to FIG. 4.

At block 1106, the process 1100 identifies the uncategorized virtual machines 785 as unprotected. Since the virtual machines 785 with no assigned backup policy do not fit into any of the criteria associated with pre-defined backup policies, they are not assigned a backup policy associated with any of the auto-discovery rules. Consequently, the data from these virtual machines is not backed up by the information management system 750.

At block 1108, the process 1100 notifies the system or network administrator of the unprotected virtual machines 785. In an embodiment, the process 1100 notifies the administrator through a graphical user interface.

Figure 7:
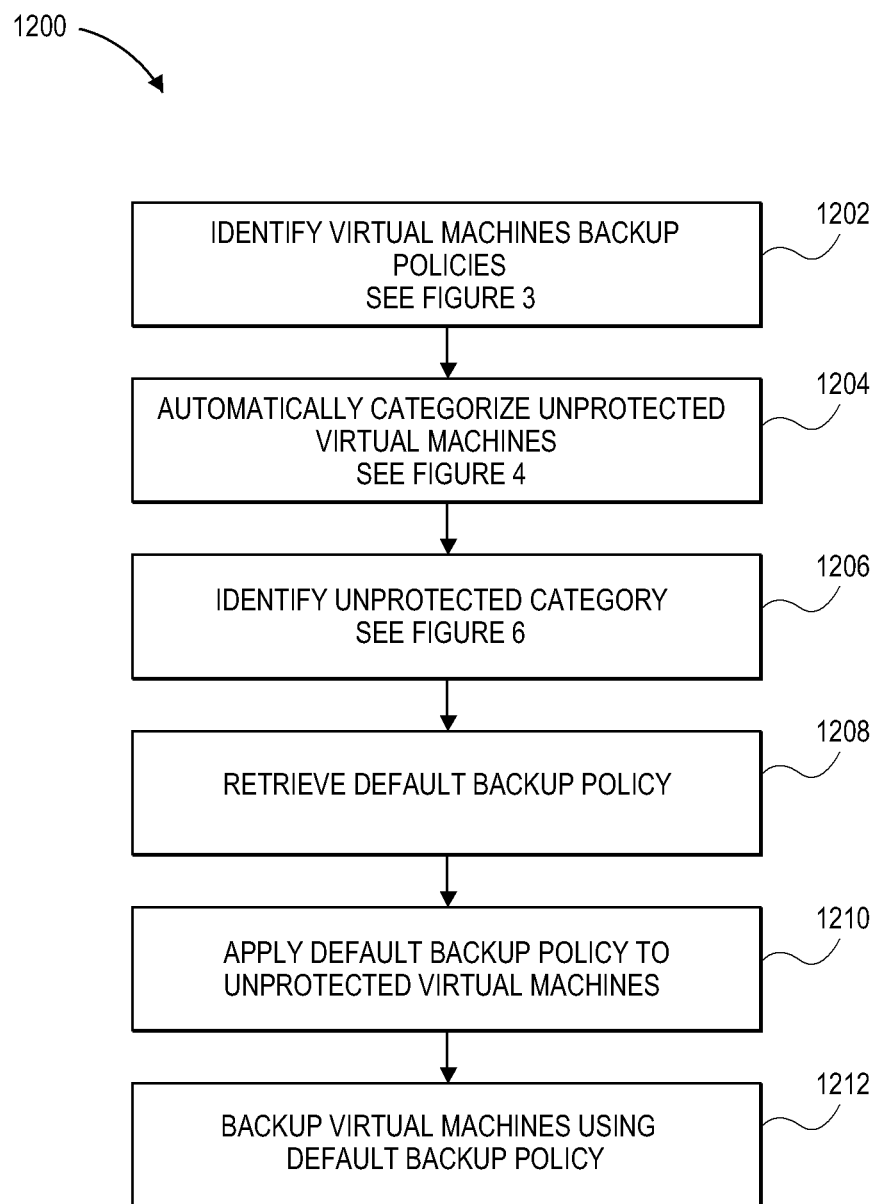
FIG. 7 illustrates a flow chart of an exemplary embodiment of a process to protect unprotected virtual machines usable by the system of FIG. 2.

FIG. 7 illustrates a flow chart of an exemplary embodiment of a process 1200 to protect unprotected virtual machines 785 usable by the information management system 750. At block 1202, the process 1200 identifies the virtual machine backup policies of the virtual machines 785 in the information management system 750. In an embodiment, the process 1200 identifies which virtual machines 785 in the information management system 750 are not assigned a backup policy by comparing the list of virtual machines in the system 750 with the list of machines in the system 750 having designated backup policies, as described above with respect to FIG. 3.

At block 1204, the process 1200 automatically categorizes unprotected virtual machines 785. In an embodiment, the process 1200 automatically compares the backup characteristics of the virtual machines 785 without designated backup policies to the criteria associated with categories of auto-discovery rules such that when there is a match, the virtual machine is assigned the backup policy associated with the matching category and when there is no match, the virtual machine 785 is identified as uncategorized, as described above with respect to FIG. 4.

At block 1206, the process 1200 identifies the virtual machines with no designated backup policy and which do not fit into any of the categories of auto-discovery rules as belonging to the unprotected category, as described above with respect to FIG. 6.

At block 1208, the process 1200 retrieves a default backup policy. In an embodiment, the process 1200 retrieves a default backup policy from the policies stored in the management database 260. Since the system 750 does not have the information to automatically assign a backup policy tailored to the usage, location, and the like of the unprotected virtual machine 785, the process 1200 uses a previously defined catch-all backup policy. For example, a default backup policy may specify which volume or secondary storage device 215 to store the backup data, a minimal bi-weekly recovery period, and the like.

At block 1210, the process 1200 automatically applies the backup default policy to the unprotected virtual machines 785. In an embodiment, the process 1200 associates the default backup policy with the virtual device 785 and stores an indication of the association in the management database 260.

At block 1212, the process 1200 automatically backs up the virtual machines 785 with the default backup policy. Thus, virtual machines 785 which were never assigned a backup policy by system administrators and do not meet any of the criteria for pre-defined backup policies are automatically protected.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A computer-implemented method performed by computer hardware including one or more computer processors, the method comprising:

automatically identifying at least one unprotected virtual machine that is not associated with at least one backup policy of a data management system, wherein the at least one unprotected virtual machine is hosted by computer hardware comprising one or more computer processors;

comparing backup characteristics associated with the at least one unprotected virtual machine with backup criteria of the at least one backup policy of the data management system, wherein the backup criteria comprise a type of virtual machine manager associated with the at least one unprotected virtual machine;

based on determining that backup characteristics associated with a first virtual machine among the at least one unprotected virtual machine match backup criteria of a first backup policy among the at least one backup policy of the data management system, automatically applying the first backup policy to the first virtual machine and converting primary data generated by the first virtual machine, wherein the primary data generated by the first virtual machine is in a native format, into secondary data that is stored, in a backup format, at one or more secondary storage devices; and based on determining that backup characteristics associated with a second virtual machine among the at least one unprotected virtual machine do not match the backup criteria of the at least one backup policy of the data management system, automatically applying a default backup policy to the second virtual machine and converting primary data generated by the second virtual machine, wherein the primary data generated by the second virtual machine is in a native format, into secondary data that is stored, in a backup format, at the one or more secondary storage devices.

2. The method of claim 1 further comprising:
automatically assigning at least one of: the first backup policy to the first virtual machine, and the default backup policy to the second virtual machine, and storing a corresponding assignment in a management database of the data management system, wherein the management database comprises the at least one backup policy.

3. The method of claim 1 further comprising:
executing a storage manager on at least one of the one or more computer processors, wherein to perform the comparing, the storage manager queries virtual machine management software for a first list of virtual machines, wherein the virtual machine management software executes on computer hardware comprising one or more computer processors.

4. The method of claim 3 wherein the first list of virtual machines in is stored in a database associated with the virtual machine management software.

5. The method of claim 3 wherein a second list of virtual machines is stored in a management database associated with the storage manager, and wherein the at least one unprotected virtual machine is on the first list and is not on the second list.

6. The method of claim 5 wherein the automatically identifying of the at least one unprotected virtual machine is based on comparing the first list with the second list.

7. The method of claim 1 further comprising providing a notification of the at least one unprotected virtual machine through a graphical user interface.

8. The method of claim 1 further comprising executing a storage manager on at least one of the one or more computer processors; and
by the storage manager, storing an indication of the at least one unprotected virtual machine.

9. The method of claim 8 wherein the indication is stored in a management database associated with Hall the storage manager.

10. The method of claim 1 wherein virtual machine management software retrieves the backup characteristics associated with the at least one unprotected virtual machine, and wherein the virtual machine management software executes on computer hardware comprising one or more computer processors.

11. A data management system for making secondary copies of primary data, the data management system comprising:
a storage manager comprising computer hardware including one or more computer processors, the storage manager configured to:
automatically identify at least one unprotected virtual machine that is not associated with at least one backup policy of the data management system, wherein the at least one unprotected virtual machine is hosted by computer hardware comprising one or more computer processors;
compare information associated with the at least one unprotected virtual machine with backup criteria of the at least one backup policy, wherein the backup criteria comprise a type of virtual machine manager associated with the at least one unprotected virtual machine;
based on a determination that first information associated with a first virtual machine among the at least one unprotected virtual machine matches backup criteria of a first backup policy among the at least one backup policy, automatically apply the first backup policy to the first virtual machine and, based on the first backup policy, cause primary data generated by the first virtual machine, wherein the primary data generated by the first virtual machine is in a native format, to be copied into one or more secondary copies in a backup format, which are stored at one or more secondary storage devices; and
based on a determination that the first virtual machine does not match any of the backup criteria, automatically apply a default backup policy to the first virtual machine and, based on the default backup policy, cause the primary data generated by the first virtual machine to be copied into one or more secondary copies in a backup format, which are stored at the one or more secondary storage devices.

12. The data management system of claim 11 wherein the storage manager is further configured to automatically assign the first backup policy to the first virtual machine and to store a corresponding assignment in a database of the data management system, wherein the database comprises the at least one backup policy.

13. The data management system of claim 11 wherein to perform the compare, the storage manager is further configured to query virtual machine management software for a first list of virtual machines, wherein the virtual machine management software executes on computer hardware comprising one or more computer processors.

14. The data management system of claim 13 wherein the first list of virtual machines is stored in a database associated with the virtual machine management software.

15. The data management system of claim 13 wherein a second list of virtual machines is stored in a management database associated with the storage manager, and wherein the at least one unprotected virtual machine is on the first list and is not on the second list.

16. The data management system of claim 15 wherein to automatically identify at least one unprotected virtual machine the storage manager is further configured to compare the first list with the second list.

17. The data management system of claim 11 wherein the storage manager provides a notification of the at least one unprotected virtual machine through a graphical user interface.

18. The data management system of claim 11 wherein the storage manager is further configured to store an indication of the at least one unprotected virtual machine.

19. The data management system of claim 18 wherein the indication is stored in a management database associated with the storage manager.

20. The data management system of claim 11 wherein virtual machine management software retrieves the information associated with the at least one unprotected virtual machine, and wherein the virtual machine management software executes on computer hardware comprising one or more computer processors.

* * * * *